United States Patent [19]
Thornberg et al.

[11] Patent Number: 6,097,700
[45] Date of Patent: Aug. 1, 2000

[54] PACKET SWITCHED RADIO CHANNEL CONGESTION CONTROL

[75] Inventors: Carl Magnus Thornberg; Magnus Andersson, both of Stockholm; Olle Erik Grimlund, Bromma, all of Sweden

[73] Assignee: Telefonaktiebolaget L M Ericsson (PUBL), Stockholm, Sweden

[21] Appl. No.: 08/581,476

[22] Filed: Oct. 24, 1995

Related U.S. Application Data

[63] Continuation-in-part of application No. 08/529,559, Sep. 18, 1995.

[51] Int. Cl.[7] .................................. H04Q 7/38; H04J 3/14
[52] U.S. Cl. ............................................ 370/233; 370/444
[58] Field of Search .............................. 370/17, 60, 60.1, 370/94.1, 94.3, 85.7, 95.1, 95.3, 229, 230, 231, 232, 233, 234, 444, 252, 253; 455/33.1, 34.1, 34.2, 53.1, 54.1, 54.2; 379/59

[56] References Cited

U.S. PATENT DOCUMENTS

| | | | |
|---|---|---|---|
| 4,409,592 | 10/1983 | Hunt ............................................ | 370/94 |
| 4,771,424 | 9/1988 | Suzuki et al. ............................... | 370/86 |
| 4,797,875 | 1/1989 | Pospischil et al. ......................... | 370/92 |
| 4,887,265 | 12/1989 | Felix .......................................... | 370/94.1 |
| 4,984,264 | 1/1991 | Katsube .................................... | 379/197 |
| 5,050,161 | 9/1991 | Golestani .................................. | 370/60 |
| 5,070,498 | 12/1991 | Kakuma et al. ........................... | 370/60 |
| 5,090,011 | 2/1992 | Fukuta et al. .............................. | 370/60 |
| 5,115,429 | 5/1992 | Hluchyj et al. ............................ | 370/94.1 |
| 5,115,433 | 5/1992 | Baran et al. ............................... | 370/94.3 |
| 5,119,367 | 6/1992 | Kawakatsu et al. ....................... | 370/54 |
| 5,131,020 | 7/1992 | Liebesny et al. .......................... | 379/59 |
| 5,146,454 | 9/1992 | Courtois et al. ........................... | 370/84 |
| 5,195,090 | 3/1993 | Bolliger et al. ............................ | 370/94.1 |
| 5,220,674 | 6/1993 | Morgan et al. ............................ | 395/800 |
| 5,274,625 | 12/1993 | Derby et al. ............................... | 370/17 |
| 5,276,677 | 1/1994 | Ramamurthy et al. .................... | 370/60 |
| 5,289,462 | 2/1994 | Ahmadi et al. ............................ | 370/60.1 |
| 5,335,222 | 8/1994 | Kamoi et al. .............................. | 370/60 |
| 5,347,511 | 9/1994 | Gun ............................................ | 370/60 |
| 5,357,507 | 10/1994 | Hughes et al. ............................. | 370/60 |
| 5,365,520 | 11/1994 | Wang et al. ................................ | 370/60 |
| 5,377,192 | 12/1994 | Goodings et al. ......................... | 370/95.3 |
| 5,381,407 | 1/1995 | Chao .......................................... | 370/58.1 |
| 5,384,826 | 1/1995 | Amitay ...................................... | 379/60 |
| 5,398,012 | 3/1995 | Derby et al. ............................... | 340/825.03 |
| 5,400,329 | 3/1995 | Tokura et al. ............................. | 370/84 |
| 5,420,863 | 5/1995 | Taketsugu et al. ........................ | 370/95.3 |
| 5,497,504 | 3/1996 | Acampora et al. ........................ | 455/33.2 |
| 5,521,925 | 5/1996 | Merakos et al. . | |
| 5,533,024 | 7/1996 | Owada ....................................... | 370/84 |
| 5,537,395 | 7/1996 | Alles et al. ................................ | 370/17 |

FOREIGN PATENT DOCUMENTS

| | | |
|---|---|---|
| 0 332 818 | 1/1989 | European Pat. Off. . |
| 0 415 898 | 8/1990 | European Pat. Off. . |
| WO 86/00775 | 1/1986 | WIPO . |
| WO 95/03679 | 2/1995 | WIPO . |
| WO 95/16330 | 6/1995 | WIPO . |

OTHER PUBLICATIONS

XV International Switching Symposium, vol. 1, Apr. 23, 1995 Berlin; GE, pp. 246–250, XP 000495573 Bianchi, et al. "Dynamic Channel Allocation Procedures for Packet Data Services over GSM Networks".

*Primary Examiner*—Hassan Kizou
*Assistant Examiner*—Kwang Bin Yao
*Attorney, Agent, or Firm*—Jenkens & Gilchrist, P.C.

[57] ABSTRACT

A method and system for controlling congestion on a packet switched radio channel (PRCH) is disclosed. A PRCH congestion control function determines if the average time delay for packet calls on the PRCH is within a delay alarm level. If the average time delay is not within the delay alarm level, it is then determined which packet calls to expel from the PRCH in order to decrease the average time delay. The determination of congestion may be made for each of the uplink and downlink of a PRCH separately, or, on the combined uplink and downlink of the PRCH.

14 Claims, 15 Drawing Sheets

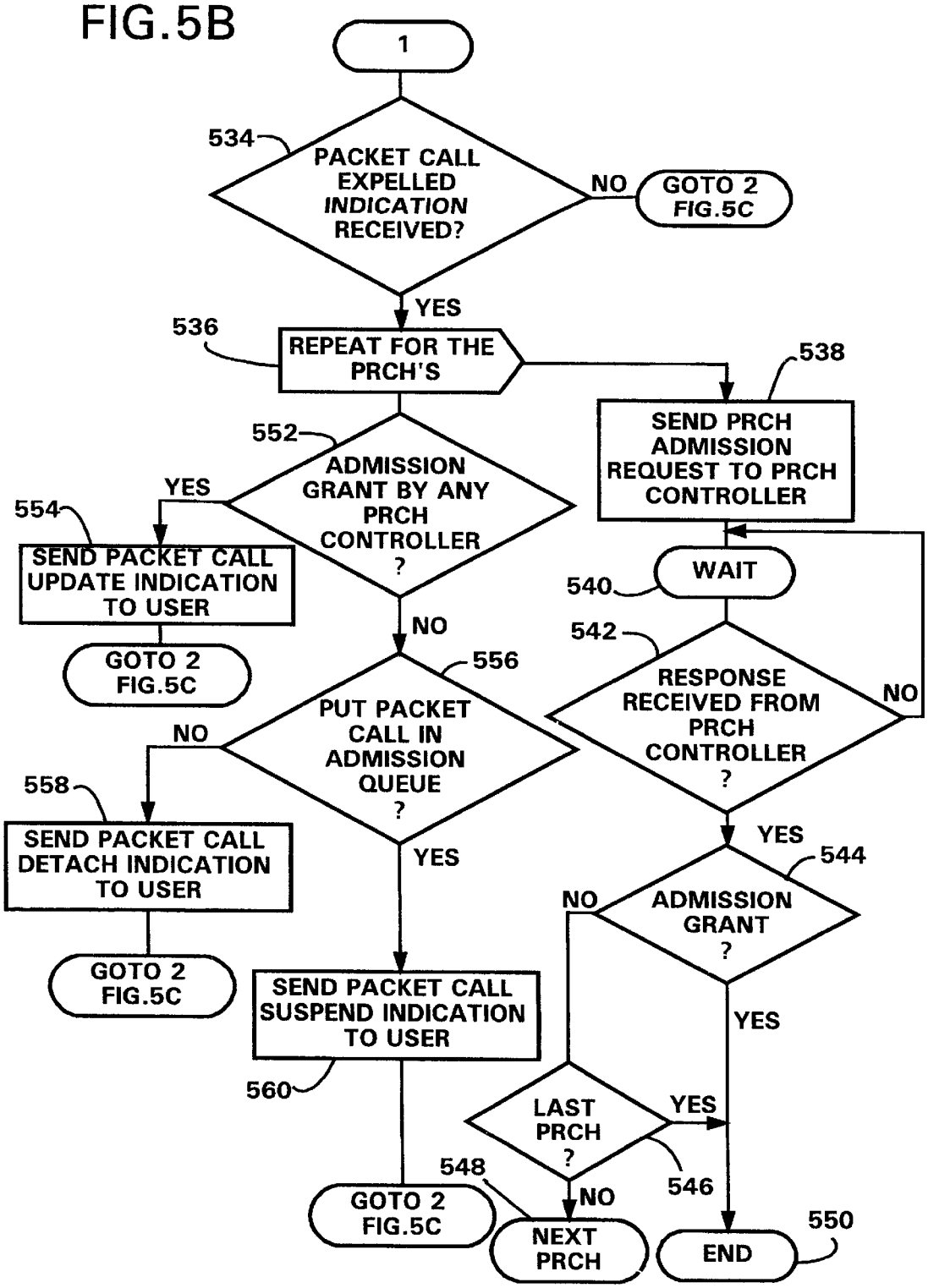

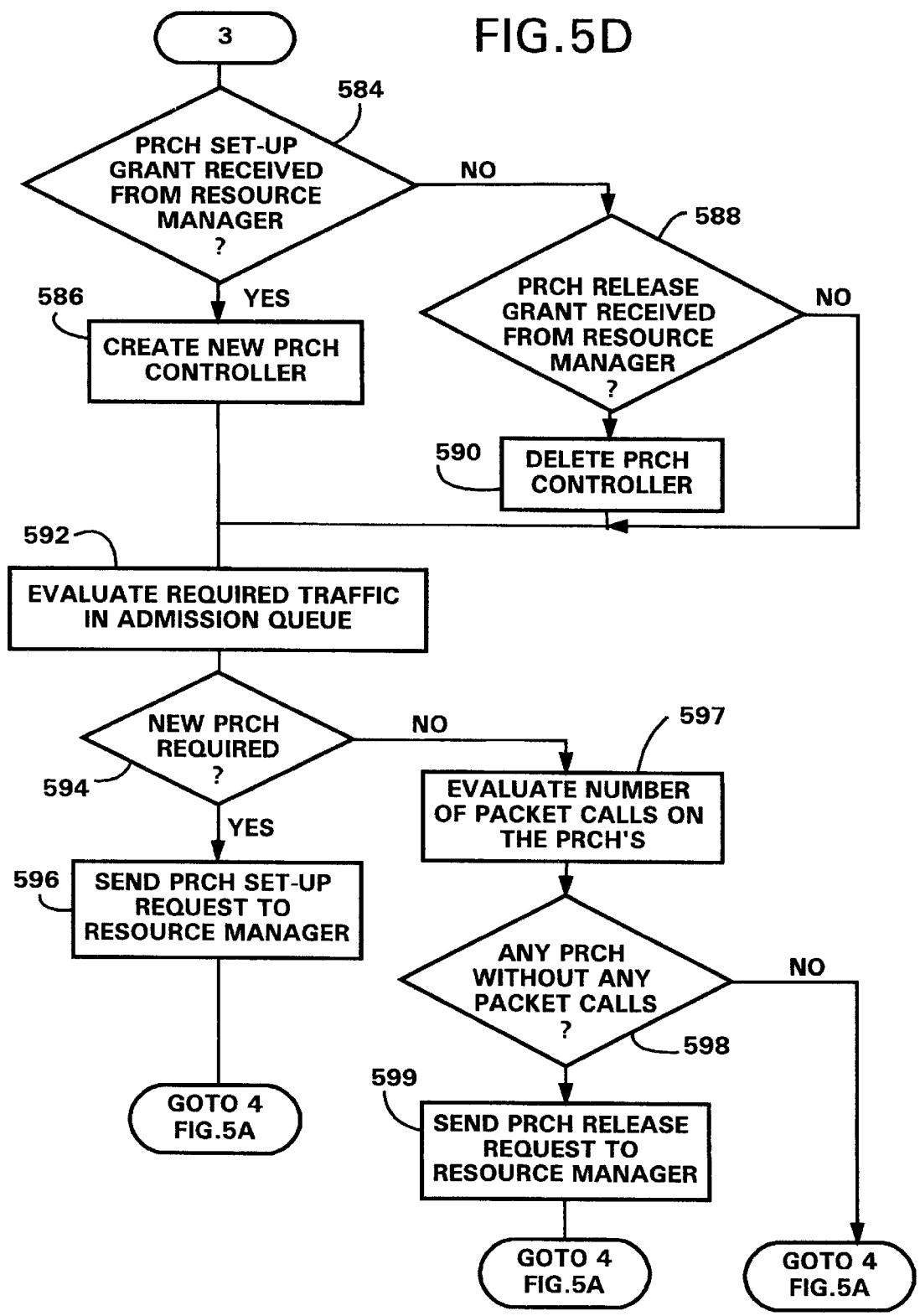

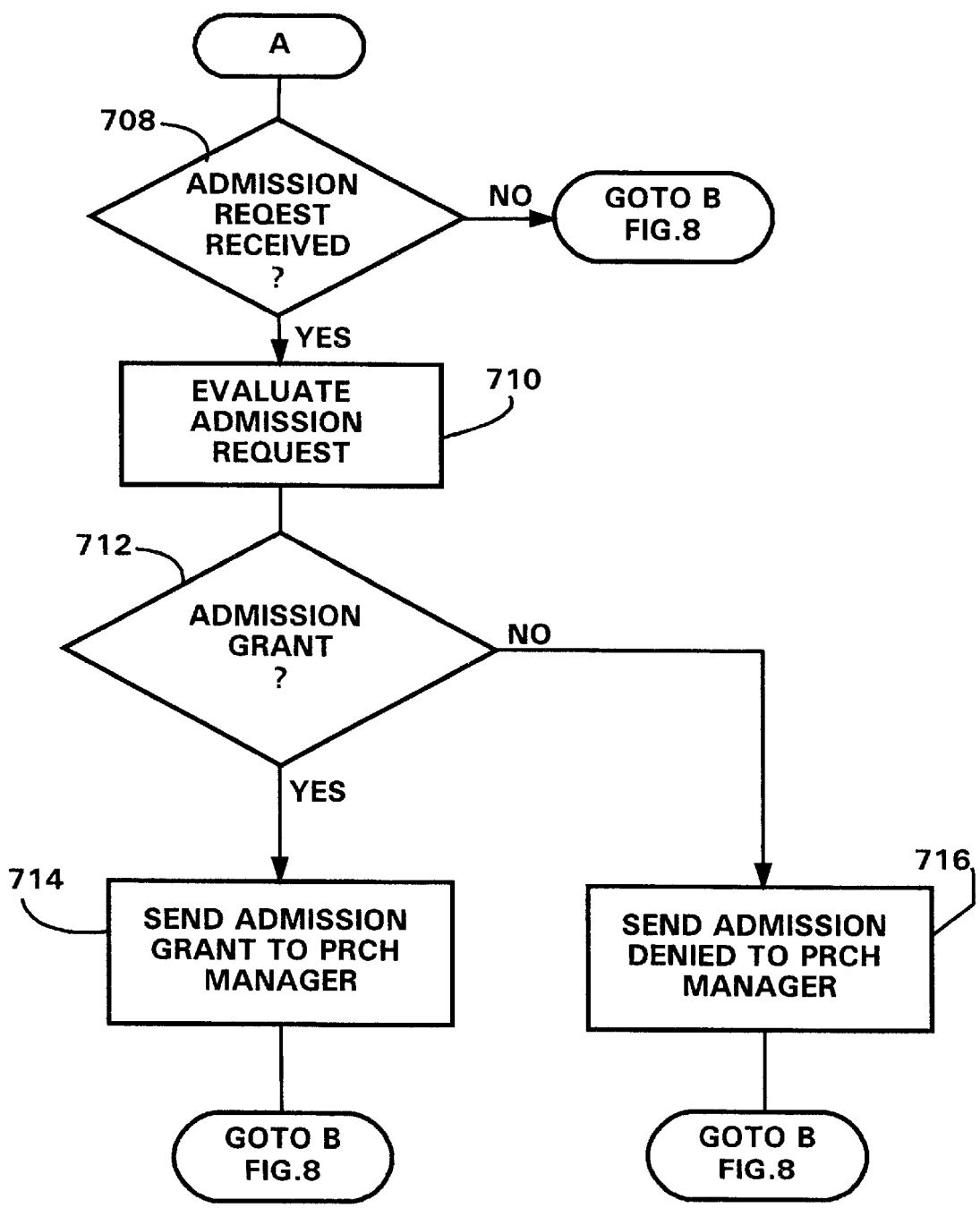

PACKET SWITCHED RADIO CHANNEL CONGESTION CONTROL

The present application is a continuation-in-part of copending U.S. patent application Ser. No. 08/529,559, entitled "PACKET SWITCHED TRAFFIC MANAGEMENT IN A CELLULAR TELECOMMUNICATIONS SYSTEM", filed on Sep. 18, 1995.

BACKGROUND OF THE INVENTION

1. Field of the Invention

This invention relates to packet switched telecommunications systems and, more particularly, to a method and system for controlling packet switched radio channel congestion in a telecommunications system.

2. History of the Prior Art

As the capability to offer a greater number and variety of services within cellular telecommunications systems develops, packet switched services will play an increasingly important role in the field of cellular telecommunications. The application of many computer and related data services to cellular systems requires the transfer of single or multiple data packets over the radio link of a cellular telecommunications system. Certain of these services such as e-mail and tele-banking may be implemented with a store and forward short message service. Other services, such as terminal emulation, local area networks, bank server access, and credit card verification, however, require interactive usage, short time delays and the capability to handle data packets of widely varying lengths. It is certain that future cellular systems will have to support such services with an efficient packet-data service.

Recognition of the importance of packet data services has resulted in the current effort of the European Technical Standards Institute (ETSI) to develop such a service for the European 2+ Group Special Mobile (GSM) cellular system. This recognition has also resulted in an effort to design packet-data service capability into the Universal Mobile Telephone System (UMTS) currently under development in the RACE II Code Division Testbed (CODIT) project R2020. The CODIT project was set up by the Commission of the European Community for the purpose of defining a future mobile telecommunications system using code division multiple access (CDMA) techniques.

Packet-switched data service in a cellular telecommunications network is characterized by calls from network users to mobile users being transmitted to packet switched mobile stations on the shared downlink (DL) of a packet switched radio channel (PRCH) and, by one or more mobile users sharing the uplink (UL) of the PRCH. The DL PRCH is shared by network users on a queued basis. The UL PRCH is shared by each mobile user accessing the channel in random fashion, as the mobile user requires, to transmit data to the system.

A common method of allowing access to the PRCH is through a packet-switched contention mode. The currently defined CODIT UMTS packet-data service is of the contention mode type. In the packet-switched contention mode mobile users transmit data packets on the PRCH when it is necessary to transfer data. An identification of the transmitting mobile user is contained in each data packet. The transmission of data packets by the mobile user may be done either randomly, or upon sensing an idle signal indicating that the packet-data channel is not presently used by another mobile station. If two or more mobile users simultaneously contend for an idle packet-data channel, the system will only allow one access to the channel. Mobile users unsuccessful at accessing the channel must repeat the transmission of the data packet until it is accepted by the system. The system users transmitting data packets to mobile users also contend for the downlink by being placed in a queue.

Because in such a system each user accesses the packet-switched channel in a random fashion, uncontrolled flow of users to, from, and between the packet-switched radio channels of a cellular system may cause packet transmission delays in the system. The delay may be incurred by both mobile users on the uplink and network users transmitting to mobile users on the downlink. As the number of packet calls on the packet switched channel increases, the average transmission delay for each packet call increases. In some applications the delays may be unacceptable.

Therefore, a need exists for a method and system for controlling packet transmission delay on one or more packet switched radio channels of a cellular system. If contending packet calls could be selectively chosen for admission to a packet radio channel according to predefined criteria, delays for packet switched channel users in applications that cannot tolerate a long packet delay time could be avoided and reduced.

A method and system for managing the flow of prioritized users to, from, and between one or more packet switched radio channels, with each packet switched radio channel having a maximum tolerable packet transmission delay, would meet such a need.

SUMMARY OF THE INVENTION

The present invention provides a method and system for packet switched radio channel congestion control in a telecommunications system. The invention allows a system operator to set the maximum average time delay that will be incurred in a packet call for a user allowed access to a packet switched radio channel (PRCH). By setting a maximum average time delay on one or more PRCHs of a system, a system operator can be assured that PRCH users are not subject to unacceptable packet transmission delays. When the estimated average time delay for packet calls on the PRCH is within a predetermined range of the set maximum average time delay, lower priority packet calls can be expelled from the PRCH. The average time delay for higher priority packet calls in which long packet delays cannot be tolerated will then decrease to below the set maximum average time delay. This avoids the problems associated with conventional contention mode packet switched systems in which users each randomly contend for use of the PRCH. In such conventional systems, the average time delay for data packet transmission rises as the number of users contending for the PRCH increases.

In one embodiment, the invention comprises a PRCH congestion control function for each PRCH of a system. The congestion control function determines if the average time delay for packet calls on the PRCH is within a delay alarm level set by the system operator. If the average time delay is not within the delay alarm level, the congestion control function then performs an evaluation as to which packet calls to expel from the PRCH. Packet calls are chosen for expulsion beginning with the lowest priority packet calls and may be expelled singly or as a group. When a single packet call is selected for expulsion, the packet call having lowest priority of packet calls on the PRCH is selected. If more than one packet call exists having the lowest priority, a single packet call is selected at random or, on the basis of a comparison of parameters associated with each of the lowest priority packet calls.

When more than one packet call is to be expelled, the packet calls are selected for expulsion starting with the lowest priority packet calls. A number of packet calls are selected until the sum of the average data traffic from the selected calls is greater than or equal to the excess data traffic on the PRCH. If it is necessary to chose from more than one packet call having the same priority, a packet call may be selected at random or, on the basis of a comparison of parameters associated with each of the packet calls.

In alternatives of the embodiment, the congestion control function may be used to determine congestion on the uplink and downlink of a PRCH separately, or, on the combined uplink and downlink.

BRIEF DESCRIPTION OF THE DRAWINGS

A more complete understanding of the method and system of the present invention may be had by reference to the following detailed description when taken in conjunction with the accompanying drawings wherein:

FIGS. 5A–5D are flow diagrams illustrating process steps followed by the packet radio channel management function according to an embodiment of the present invention;

FIG. 7 is a flow diagram illustrating process steps followed by the packet radio channel controller admission control function according to an embodiment of the present invention;

DETAILED DESCRIPTION

Figure 1:
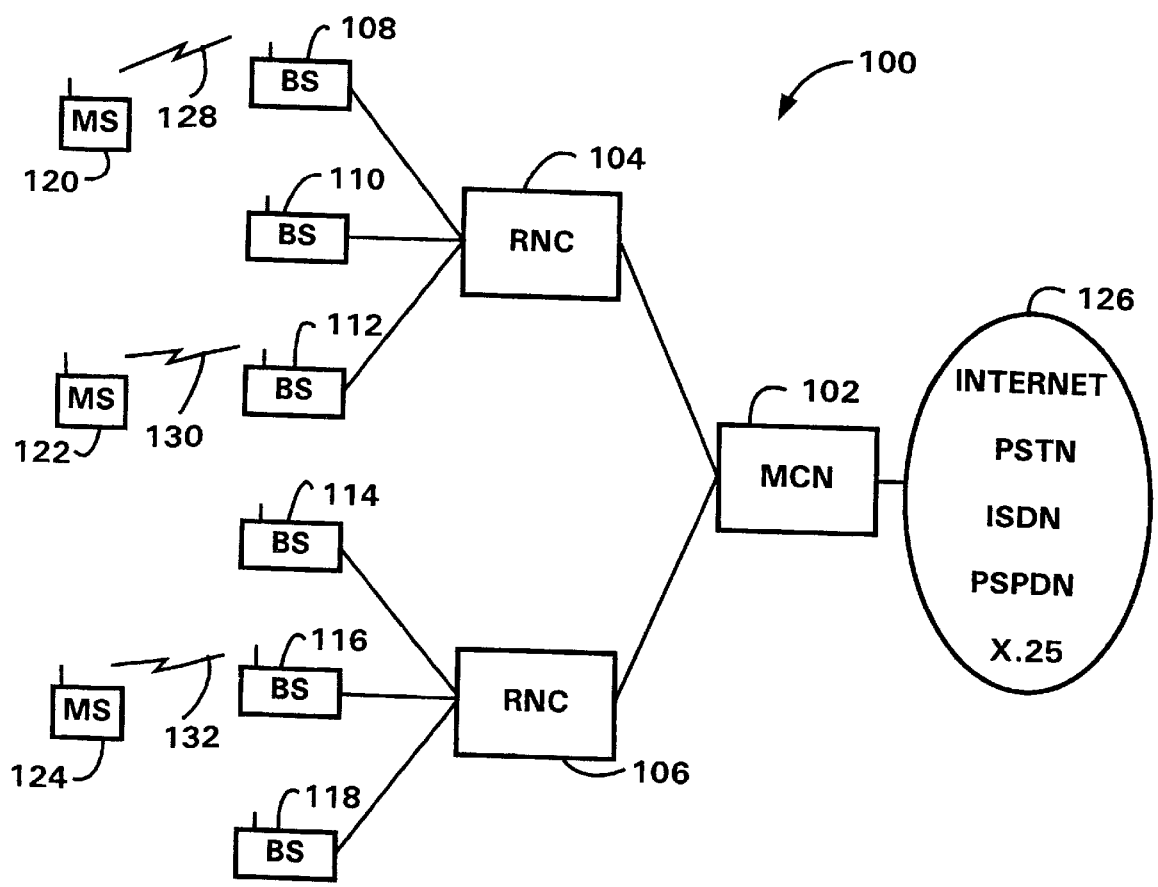
FIG. 1 is a block diagram of a cellular telecommunications system into which the present invention may be implemented.

Referring now to FIG. 1, therein is illustrated a block diagram of a cellular telecommunications system 100 into which the present invention may be implemented. Cellular system 100 comprises mobile control node (MCN) 102, radio network controllers (RNCs) 104 and 106, base stations (BSs) 108, 110, 112, 114, 116 and 118, and mobile stations (MSs) 120, 122 and 124. Each base station 108, 110, 112, 114, 116 and 118 controls system radio communications with mobile stations within the radio coverage area, termed a cell, of the base station.

Mobile stations 120, 122 and 124 communicate with a particular base station, of base stations 108, 110, 112, 114, 116 and 118, depending on which base station's coverage area the mobile is located. In FIG. 1 mobile stations 120, 122, and 124 are shown to be communicating via radio interfaces 128, 130 and 132 with base stations 108, 112 and 116, respectively. Base stations 108, 110 and 112 are connected to radio network controller 104, and, base stations 114, 116 and 118 are connected to radio network controller 106. Radio network controllers 104 and 106 are in turn connected to mobile control node 102. Mobile control node 102 is a switching center that supports the interconnection of the cellular system to fixed network 126. Mobile control node 102 may be connected to fixed network 126 by landlines or other equivalent connections. The fixed network 126 may comprise an internet network, a public switched telephone network (PSTN), an integrated services digital network (ISDN), a packet switched public data network (PSPDN), or a X.25 system. While the cellular telecommunications system of FIG. 1 is shown as a particular configuration, the block diagram is intended to be only an exemplary configuration of a system into which the present invention may be implemented. The invention has application to any packet switched radio system in which users contend for a packet switched radio channel (PRCH).

In an embodiment of the invention, cellular system 100 operates according to protocols developed for the Code Division Testbed (CODIT) Universal Mobile Telephone System (UMTS) project with the PRCH contention mode access specified for the CODIT/UMTS controlled by the PRCH traffic management function of the invention. The UMTS is a mobile communication system using direct sequence code division multiple access (DS-CDMA) with a multi-rate radio interface architecture. In the CODIT/UMTS system packet radio service is provided to mobile stations 120, 122 and 124 via one or more PRCHS. Each base station 108, 110, 112, 114, 116 and 118 establishes and terminates one or more PRCHs at the request of radio network controllers 104 and 106 or mobile control node 102. The PRCH is a full duplex, asymmetrical channel that can be operated independently on both the uplink (UL) and downlink (DL) at variable mobile station data rates up to 9.6 kbps (narrow band channel) or up to 64 kbps (medium band channel). MCN 102 can attach multiple mobile stations to a single PRCH within a single cell. To distinguish several mobile stations on a PRCH, MCN 102 assigns each mobile a virtual connection identifier (VCI) when it grants access. The VCI is represented by a k bit number and serves as a unique address within the area controlled by MCN 102.

The PRCH is structured in ten ms time slots to convey fragmented packets between mobile stations 120, 122 and 124 and the network. On the DL, the mobile control node 102 can send mobile station data packets and information for controlling the access and data transfer on the UL to one mobile station or simultaneously to a plurality of mobile stations. On the UL, the mobile stations may share access to a UL PRCH if within the coverage area of the same base station. After gaining access to the PRCH, the mobile station transmits the packet to the system over a physical channel. The logical channel PRCH is mapped onto two physical channels comprising a physical data channel (PDCH) and a physical control channel (PCCH). Two base station transceivers are required for supporting one PRCH.

Figure 2:
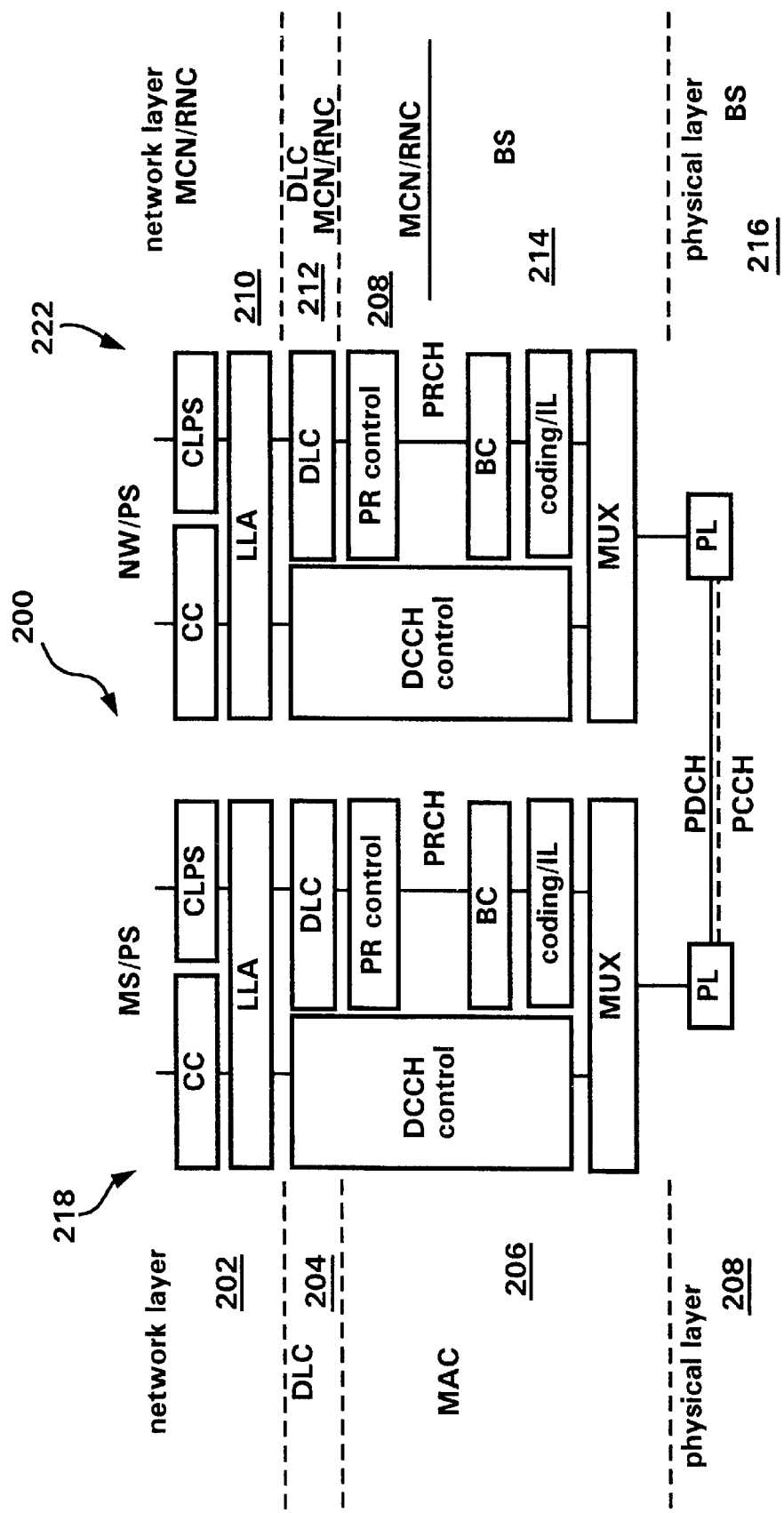
FIG. 2 illustrates the control plane protocol architecture for the packet switching functions of a cellular telecommunications system into which the present invention may be implemented.

Referring now to FIG. 2, therein is illustrated the protocol stack 200 for the packet switching functions of the CODIT/ UMTS. In the mobile station the mobile station protocol stack (MS/PS) 218 comprises a network layer 202, data-link control (DLC) layer 204, a medium access control (MAC) layer 206, and the physical layer 208. On the network side, the network protocol stack (NW/PS) 220 comprises a network layer 210 and a DLC layer 212, each located within either the MCN or RNC, a medium access layer (MAC) 214 located within the base station and MCN or RNC, and a physical layer 216.

The connectionless packet service (CLPS) entity of network layer 202 provides the packet service to the mobile station. The CLPS of network layer 210 provides the functions of registration, authentication, assigning and administering VCIs and interfacing to a packet data network. During a packet call, the CLPS entities use a logical link administrator (LLA) to initially route packet service set-up signals via a dedicated control channel (DCCH and CC). After the packet service set-up, the mobile station is attached to a PRCH and all messages between the CLPS, including mobile station data packets, are passed through the DLC to a packet-radio (PR) control entity. The PR entity is also responsible for normal mobile telephone system functions such as handover, connection re-establishment, etc.

The packets to be transmitted on the PRCH are fragmented, protected with a block code (BC) for detecting transmission errors on the receiving side, convolutionally encoded, interleaved (IL), switched through a multiplexer (MUX) and then transmitted over the PDCH. Control information, e.g. for power control, may also be transferred via the PCCH. On the receiving side, the fragments are reconstructed from the received samples, reassembled into packets, and forwarded to a connectionless packet service (CLPS) entity. When a block decoder on the receiving side detects the receipt of an erroneous packet fragment, a packet radio control function requests its retransmission. In cellular system 100 there may be several PRCHs distributed among the cells controlled by base stations 108, 110, 112, 114, 116 and 118.

Figure 3A:
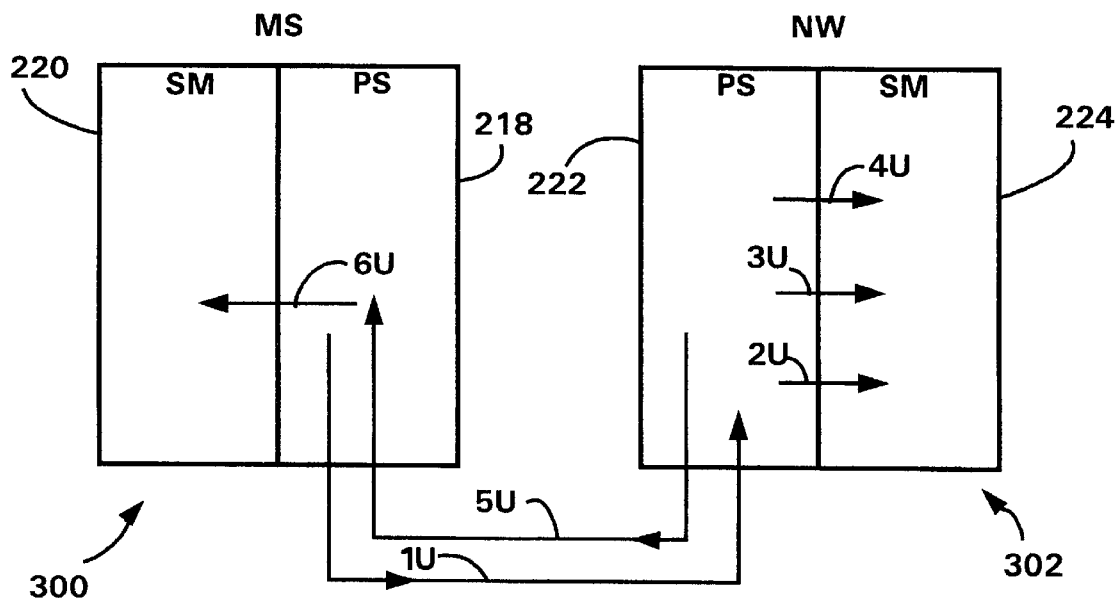
FIGS. 3A and 3B illustrate the exchange of signals on the downlink and uplink, respectively, of a cellular system packet radio channel operating according to an embodiment to the present invention.
Figure 3B:
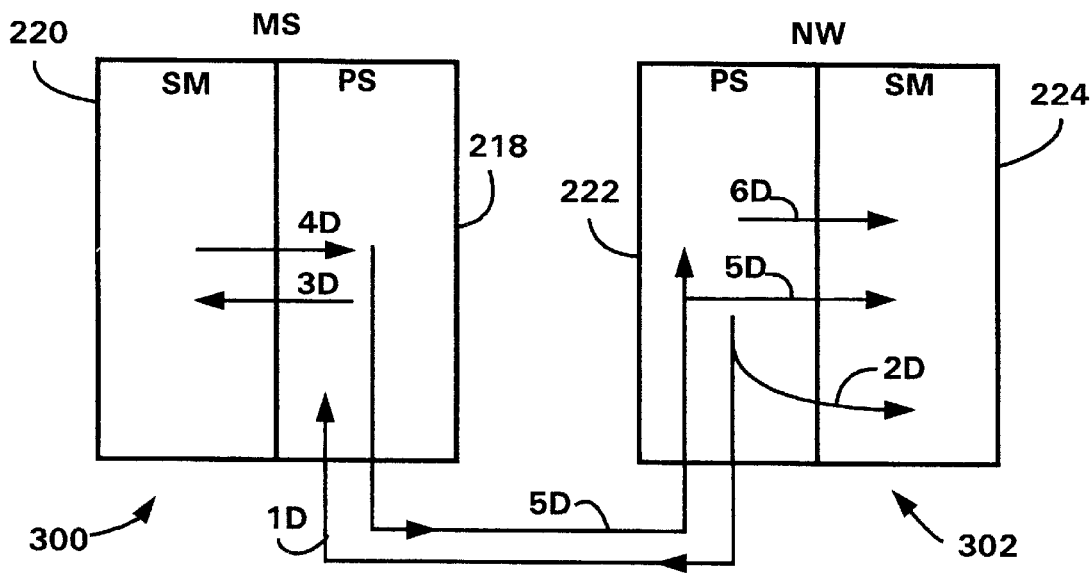

Referring now to FIGS. 3A and 3B, therein are illustrated the exchange of signals on the uplink (UL) and downlink (DL) , respectively, of a cellular system PRCH operating according to the present invention. FIGS. 3A and 3B show the signal exchanges between a mobile station (MS) 300 and the network (NW) 302. Mobile station 300 is shown functionally as mobile station protocol stack (MS/PS) 218 and mobile station system manager (MS/SM) 220. Network 302 is shown functionally as network protocol stack (NW/PS) 222 and network system manager (NW/SM) 224. The protocol stack is responsible for data transmission and the system manager is responsible for control and supervision of the connection between the network and the mobile station.

For uplink (UL) packet transmission and reception the following scheme is used (the steps correspond to the numbering of the arrows in FIG. 3A).

1U. The MS/PS 218 can send three different kinds of packets to the NW/PS 222, two of which require acknowledgment.
   a. Packets requiring acknowledgment:
      packets containing user data; and
      packets containing user data with piggy-backed downlink reports (DLRs).
   b. Packets not requiring acknowledgment:
      packets containing only DLRs.
A timer is set in MS/SM 220 when a packet requiring acknowledgment is sent. If the timer expires before an acknowledgment is received, the packet is considered to be lost.

2U. For all UL data packets, quality samples are sent to NW/SM 224. At the end of the UL packet a packet stop signal is sent to the NW/SM 224 indicating that the last quality sample has been sent for that particular packet.

3U. After receiving a UL data packet, a UL packet report is sent to NW/SM 224. This report contains information required for traffic supervision.

4U. If the UL packet contains a piggy-backed DLR or if the packet is a stand-alone DLR, the DL quality estimate is extracted and forwarded to NW/SM 224.

5U. If the transmitted UL data packet requires an acknowledgment, an acknowledgment message is sent from NW/PS 222 to the MS/PS 218. The message can be either stand-alone or piggy-backed on a DL mobile station information packet.

6U. Upon receiving an acknowledgment in MS/PS 218, A packet acknowledged signal is sent to MS/SM 220. If no acknowledgment is received before the timer introduced in Step 1 above expires, a packet lost message is sent to the MS/SM 220.

For DL packet transmission and reception the following scheme is used (the steps correspond to the numbering of the arrows in FIG. 3B):

1D. The NW/PS 222 can send three different kinds of packets to the MS/PS 218, two of which require acknowledgment.
   a. Packets requiring acknowledgment:
      packets containing user data; and
      packets containing user data with piggy-backed acknowledgment/no acknowledgment (ack/nack) information for previously received UL packets.
   b. Packets not requiring acknowledgment:
      packets containing only ack/nack information for previously received UL packets.
A timer is set when packets requiring acknowledgment are sent. If the timer expires before an acknowledgment is received, the packet is considered to be lost.

2D. When a DL data packet is transmitted, a DL packet report is sent to NW/SM 224. The report contains information required for traffic supervision.

3D. When receiving a DL data packet in MS/PS 218, quality samples are extracted for each frame and sent to MS/SM 220. At the end of the DL packet, a packet stop signal is sent to MS/SM 220 indicating that the last quality sample has been sent for that particular packet.

4D. After receiving a packet stop signal, a quality estimate is sent to MS/PS 218. This estimate is a measure of the quality of the entire packet sent on the DL.

5D. A DownLink Report (DLR) containing an ack/nack message and a quality estimate is sent to NW/PS 222 for each received DL packet containing user data. The DLR can be sent either stand-alone or piggy-backed on a UL user data packet. After receiving the DLR in NW/PS 222, the quality estimate is forwarded to NW/SM 224.

6D. If the ack/nack information in the DLR contains an acknowledgment, a packet acknowledged signal is sent to NW/SM 224. If no acknowledgment is received before the timer introduced in Step 1 above expires, a packet lost message is sent to the NW/SM 224.

Figure 4:
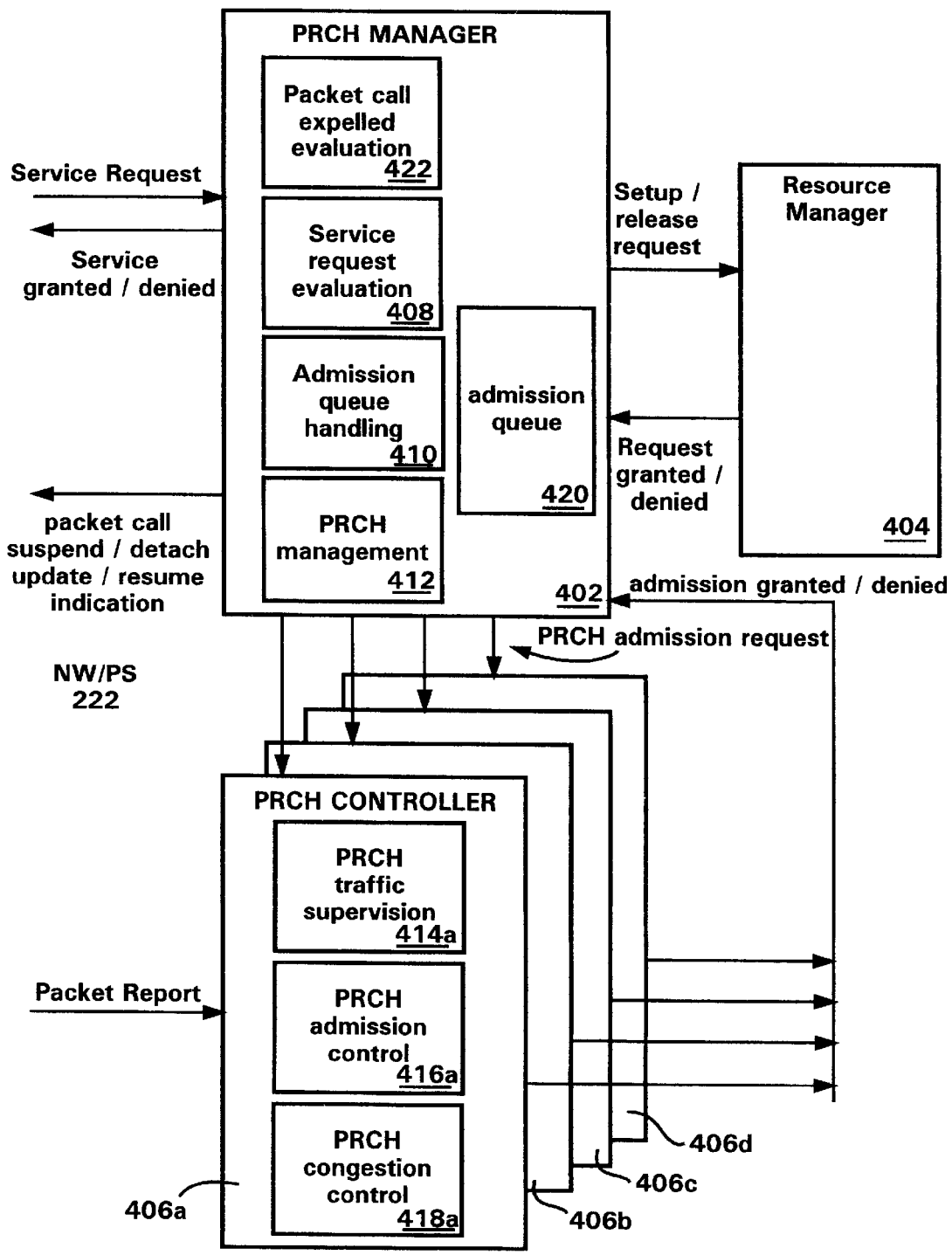
FIG. 4 is a functional block diagram of packet radio traffic management functions within a cellular system operating according to an embodiment of the present invention.

Referring now to FIG. 4, therein is a functional block diagram of packet radio traffic management functions within a cellular system operating according to the present invention. The functionality of the packet radio traffic management, which is logically located in the NW/SM 224, comprises three main blocks: PRCH manager 402, resource manager 404 and PRCH controllers 406a, 406b, 406c and 406d. Normally, there is one PRCH manager 402 for each base station of the system. If a base station supports more than one cell, there is one PRCH manager 402 for each cell. The number of PRCH controllers 406a, 406b, 406c and 406d, depends on the number of PRCHs necessary and, resources available, for packet switched traffic in the cell. In the embodiment shown in FIG. 4, there are four PRCHs in the cell. Each PRCH controller controls one PRCH comprising an uplink and downlink. The PRCH manager 402 is invoked when it is necessary for a user to have access to a PRCH of the cell. Reception of a service request via the NW/PS 222 invokes the PRCH manager 402. The PRCH manager 402 will also be invoked if a packet call has been expelled from a PRCH due to congestion and a packet call expelled indication is received from a PRCH controller. Additionally, the PRCH manager 402 will be invoked if an internally generated admission queue signal or a PRCH setup grant/denial or release grant/denial signal from the resource manager is received.

A service request could be received in any of the following situations:

1) A new user wants access to a PRCH to initiate packet switching service.
2) A user wants to make handover from a PRCH of another cell to a PRCH of the cell in which PRCH manager 402 is located.
3) A user wants to re-establish a lost PRCH connection.
4) A user wants to update its traffic requirements, see below.

Each traffic event listed above results in a service request being forwarded to the PRCH manager. The service request contains information necessary for evaluation by service request evaluation function 408 of PRCH manager 402. The information includes:

Type of request

Required estimated average user data traffic, $P_{ave}$ (scaled to the maximum user bi trate of the PRCH). This comprises separate parameters for each of the UL and DL.

Required estimated maximum user data traffic, $P_{max}$ (scaled to the maximum user bi trate of the PRCH). This comprises separate parameters for each of the UL and DL.

Priority, Pri. This parameter can assume a value within the interval $[O, Pri_{max}]$. The priority can be assigned on the basis of the mobile station initiating the call or being called, or on another basis.

A service request is evaluated through the service request evaluation function 408. In the service request evaluation, the PRCH manager 402 sends a PRCH admission request for a packet call to one of PRCH controllers 406a, 406b, 406c, or 406d. PRCH manager 402 will try each PRCH controller 406a, 406b, 406c, or 406d until admission is granted or the packet call is not admitted in any of the PRCHs. If the packet call is not admitted in any of the existing PRCHs (the PRCH admission request is denied by all PRCH controllers 406a, 406b, 406c, and 406d), PRCH manager 402 decides if the service request should be denied or if the packet call should be put in the admission queue 420 by using the admission queue handling function 410.

A packet call placed in the admission queue is temporarily suspended, i.e., no information is allowed to be exchanged between the users. If the packet call is not placed in the admission queue, a service denied signal is sent to the user. If the packet call is to be placed in the admission queue, the PRCH manager informs the users by sending a packet call suspend indication signal.

A packet call expelled indication signal is received in PRCH manager 402 from a PRCH controller when a packet call is expelled from a PRCH due to congestion, i.e., the packet call is removed from the PRCH. A packet call expelled indication signal is evaluated through the packet call expelled evaluation function 422. In the packet call expelled evaluation function 422 the PRCH manager 402 sends a PRCH admission request for the expelled packet call to one of PRCH controllers 406a, 406b, 406c or 406d. PRCH manager 402 will try each PRCH controller 406a, 406b, 406c or 406d until admission is granted or the expelled packet call is not admitted in any of the PRCHs.

If the packet call is not admitted in any of the existing PRCHs, PRCH manager 402 decides if the expelled packet call should be detached or if the expelled packet call should be put in the admission queue 420 by using the admission queue handling function. If the expelled packet call is placed in admission queue 420, the packet call is temporarily suspended and a packet call suspend indication signal is sent to the user via NW/PS 222. If the expelled packet call is not placed in the admission queue 420, a packet call detach indication signal is sent to the user via NW/PS 222.

A packet call admission queue signal indicates that the admission queue 420 should be checked. The admission queue signal may be generated by a timer set as the system operator desires. A packet call admission queue signal is evaluated through the admission queue handling function 410. In the admission queue handling function the PRCH manager 402 sends a PRCH admission request for the packet call in the admission queue with the highest priority to one of PRCH controllers 406a, 406b, 406c or 406d. PRCH manager 402 will send the admission request to each PRCH controller 406a, 406b, 406c or 406d until admission is granted or the packet call is not admitted in any of the PRCHs. If the packet call is admitted to any of the PRCHs, a packet call resume indication signal is sent to the user via NW/PS 222.

PRCH manager 402 also decides when it is necessary to set up a new PRCH or release an existing PRCH through the PRCH management function 412. In the case of both PRCH setup and PRCH release, a step up or release request signal is sent to resource manager 404 which controls the allocation of system resources for PRCHs. Resource manager 404 either denies or grants the request by sending a setup request grant or a setup request denied signal to PRCH manager 402 or sending a release request grant or release request denied signal to PRCH manager 402.

Each PRCH controller 406a, 406b, 406c and 406d supervises the traffic on one PRCH of the cell. There is one PRCH controller for each PRCH in a cell. Each PRCH controller 406a, 406b, 406c and 406d receives traffic information on the PRCH that it controls from NW/PS 222 in a packet report. The packet report is evaluated by the PRCH traffic supervision function, 414a, 414b, 414c or 414d, for the relevant PRCH. The information contained in the packet report is used to decide if new packet calls can be admitted to the PRCH through the PRCH admission control function, 416a, 416b, 416c or 416d, when an admission request is received from PRCH manager 402. The information contained in the packet report may also be used to decide if the PRCH congestion control function, 418a, 418b, 418c or 418d, should be used to expel an already admitted packet call due to PRCH overload. In this case a packet call expelled indication signal is sent to the PRCH manager. The PRCH manager then decides if the packet call should be temporarily suspended or detached through the packet call expelled evaluation function 422. Depending on this decision, the users are informed by a packet call suspend indication signal or a packet call detach indication signal.

Resource manager 404 controls the allocation of system resources for packet radio channels. The PRCH manager 402 may request that a new PRCH be set up or released by sending a PRCH setup/release request to resource manager 404. The PRCH manager 404 continuously monitors the size of the admission queue 420. Whenever the total required estimated average data traffic of all packet calls in the admission queue $P_q$ exceeds a limit $P_{new}$ PRCH set for the admission queue, a PRCH setup request is sent to the higher level resource manager 404. If $P_{new}$ PRCH is set to zero, the PRCH manager always requests more resources as soon as the existing PRCHs are full. As soon as the number of users attached to a PRCH is zero, a PRCH release request is sent to the resource manager 404. If granted, the PRCH is released.

PRCH manager 402 and PRCH controllers 406a, 406b, 406c and 406d may be implemented into the base stations, radio network controllers and mobile control nodes of a cellular system such as the system shown in FIG. 1. The actual implementation may be in either hardware or software, or in a combination of hardware and software, operating in conjunction with one or more processors. Processors and software for implementing these types of functions are well known in the art.

Referring now to FIGS. 5A, 5B, 5C and 5D, therein are shown traffic flow diagrams illustrating service request evaluation, packet call expelled evaluation, admission queue handling and PRCH management process steps, respectively, followed by PRCH manager 402 according to an embodiment of the present invention.

Figure 5A:
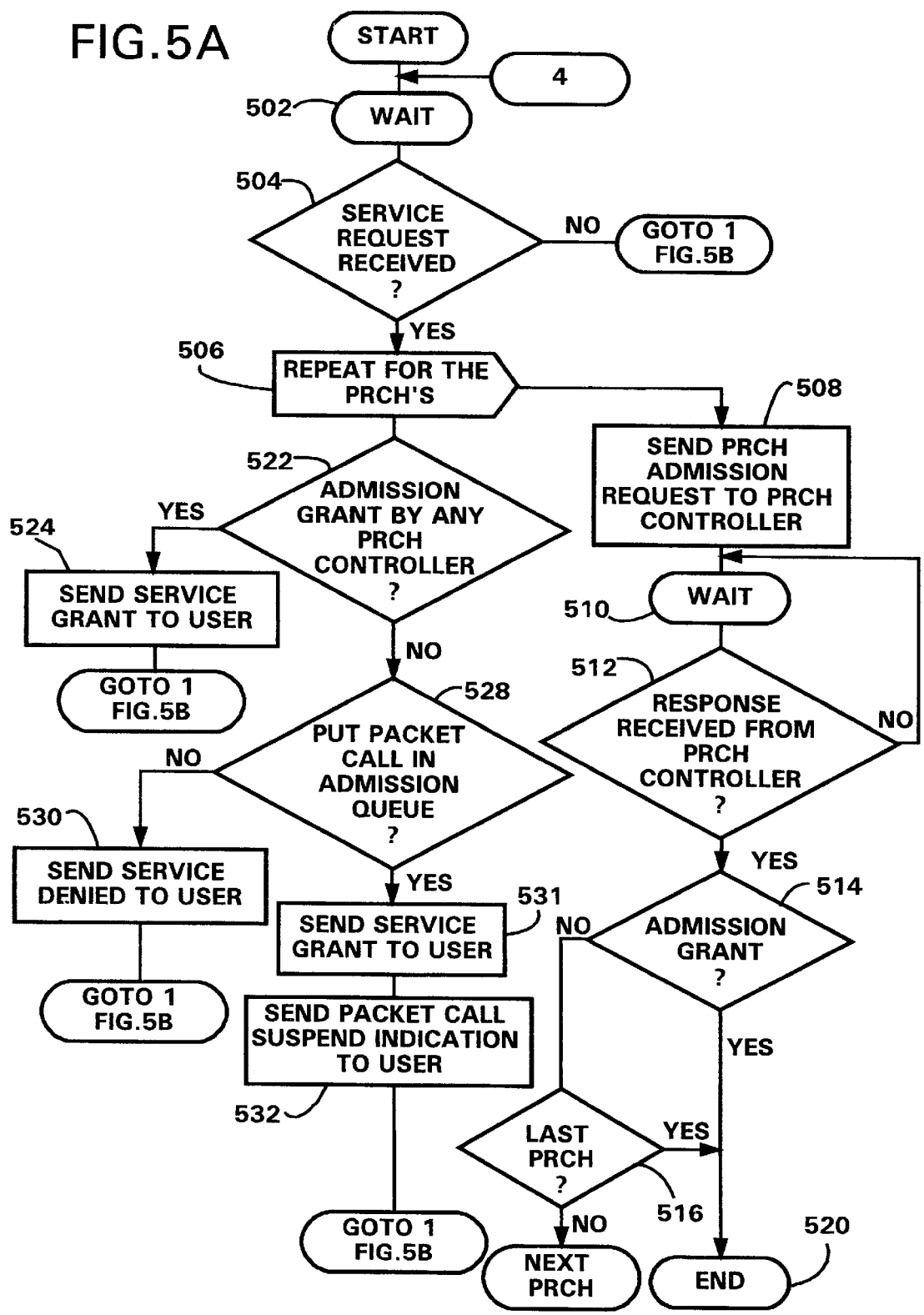

The PRCH manager 402 receives an input while in the wait state of Step 502 of FIG. 5A. The input may be a service request, a packet call expelled indication, an internally generated admission queue signal or, a PRCH setup grant or denied signal or release grant or denied signal received from resource manager 404. At Step 504 it is determined if a service request was received from NW/PS 222. If a service request was not received, the process moves to Step 534 of FIG. 5B. If, however, a service request was received, the process moves to Step 506 and begins the service request evaluation.

The service request evaluation of Step 506 involves requesting PRCH admission in Steps 508, 510, 512, 514, 516, 518 and 520. The service request evaluation is repeated for each PRCH controller 406a, 406b, 406c and 406d, sequentially, until admission to a PRCH is granted or no PRCHs remain. At Step 508 PRCH manager 402 sends a PRCH admission request to one of PRCH controllers 406a, 406b, 406c or 406d. The process then moves to Step 510 as PRCH manager 402 waits for a response. The PRCH manager 402 periodically checks at Step 512 to determine whether a response has been received from PRCH controllers 406a, 406b, 406c or 406d. If no response has been received, the process moves back to the wait state of 510. If, however, it is determined at Step 512 that a response has been received from PRCH controller 406a, 406b, 406c or 406d, the PRCH admission request process is completed and the process moves to Step 514, where it is determined if the response is an admission grant. If the response is an admission grant, the service request evaluation process is completed at Step 520 and the process moves to Step 522.

If, however, at Step 514, it is determined that the response is not an admission grant, it is an admission denied response, and the process moves to Step 516 where it is determined if the current response was sent from the last PRCH controller to which an admission request could be sent. If it was not the last PRCH controller, the process moves to Step 518 and continues the service request evaluation process of Step 506 for the next PRCH. The service request evaluation process of Step 506 is repeated until an admission grant response is received from PRCH controller 406a, 406b, 406c or 406d, or, until all PRCH controllers have denied admission. When the service request evaluation process is completed the process moves to Step 522.

At Step 522 it is determined if an admission grant response was received from any PRCH controller. If an admission grant was received from a PRCH controller, the process moves to Step 524 where a service grant signal is sent to the user via the NW/PS 308. From Step 524 the process then moves to Step 534 of FIG. 5B. If, however, at Step 522 it is determined that no admission grant was received from any PRCH controller the process moves to Step 528. At Step 528 PRCH manager 402 determines, using the admission queue handling function 410, if the packet call is to be put in the PRCH admission queue. It is determined to put the packet call in the admission queue 420 if the following criterion is fulfilled:

$$P_{ave}(r)+P_q(r)<P_{max}(r)$$

$P_{ave}(r)$ is the required estimated average data traffic for the user as a function of the service request r and $P_q(r)$ is the requested traffic of all packet calls in the admission queue of service request type r. $P_q(r)$ is a measure of the current size of the queue for the service request type. $P_{max}(r)$ is the maximum allowed requested traffic in the admission queue 420 as a function of the service request. In alternatives of the embodiment, the comparison may be done using $P_{ave}(r)$, $P_q(r)$ and $P_{max}(r)$ values for the uplinks and downlinks separately, or, using values for the uplinks and downlinks combined. It is possible to have a different $P_{max}$ for different types of service requests, r. Thereby a prioritization between different service requests can be done in Step 528. For example, when requesting a PRCH during handoff, the value of $P_{max}(r)$ may be set higher than the value of $P_{max}(r)$ is set when requesting access to a PRCH for the first time.

If it is determined, at Step 528, that the packet call is to be put in the PRCH admission queue, the call identity is placed in the admission queue 420 and the process moves to Step 531 where a service grant signal is sent to the user via NW/PS 222. The process next moves to Step 532 where a packet call suspend indication signal is sent to the user via the NW/PS 308. The process then moves to Step 534 of FIG. 5B. If, however, at Step 528, it is determined that the packet call is not to be put in the PRCH admission queue 420 the process moves to Step 530 and a service denied signal 428 is sent to the user. The process then moves to Step 534 of FIG. 5B.

At Step 534 of FIG. 5B, it is determined if a packet call expelled indication was received. If the input was not a packet call expelled indication, the process moves to Step 562 of FIG. 5C. If, however, it is determined at Step 534 that a packet call expelled indication was received, the process moves to Step 536. At Step 536 a PRCH admission request for the expelled packet call is sent to PRCH controller 406a, 406b, 406c or 406d from PRCH manager 402. The admission request process of Step 536 involves Steps 538, 540, 542, 544, 546, 548 and 550. Step 536 is repeated for each PRCH controller 406a, 406b, 406c or 406d until admission has been requested to all PRCHs. At Step 538 PRCH manager 402 sends a PRCH admission request to PRCH controller 406a, 406b, 406c or 406d. The process then moves to Step 540 as PRCH manager 402 waits for a response. The PRCH manager 402 periodically checks at Step 542 to determine whether a response has been received from PRCH controller 406. If no response has been received, the process moves back to the wait state of Step 540. If, however, it is determined at Step 542 that a response has been received from the PRCH controller to which the admission request has been sent, the process moves to Step 544 where it is determined if the response if an admission grant. If the response is an admission grant, the packet call expelled evaluation ends at Step 550 and the process moves to Step 552. If, however, at Step 544, it is determined that the response is not an admission grant, it is an admission denied response and the process moves to Step 546 where it is determined if the admission denied response was sent from the last PRCH controller to which an admission request could be sent. If it was not the last PRCH controller, the process moves to Step 566 and repeats the admission request process of Step 536 for the next PRCH. The packet call expelled evaluation of Step 536 is repeated until an admission grant response is received from a PRCH controller or, until all PRCH controllers 406a, 406b, 406c and 406d have denied admission. When the packet call expelled evaluation process of Step 536 is completed, the process moves to Step 552.

At Step 552 it is determined if an admission grant response was received from any PRCH controller during Step 536. If an admission grant was received from a PRCH controller, the process moves to Step 554 where a packet call update indication signal is sent to the user via the NW/PS 222. From Step 554 the process moves to Step 562 of FIG. 5C. If, however, at Step 552 it is determined that an admission grant was not received, the process moves to Step 556. At Step 556 PRCH manager 402 determines, using the admission queue handling function 410, if the expelled packet call is to be put in the PRCH admission queue. The same admission criteria are used at Step 556 as was described for Step 528 of FIG. 5A. If it is determined at Step 556 to place the expelled packet call in the admission queue 420, the process moves to Step 560 and a packet call suspend indication signal is sent to the user via NW/PS 222. The process then moves from Step 560 to Step 562 of FIG. 5C. If, however, it is determined at Step 556 not to place the expelled packet call in the admission queue 420, the process moves to Step 558 and a packet call detach indication signal is sent to the user via NW/PS 222. The process then moves from step 558 to Step 562 of FIG. 5C.

Figure 5C:
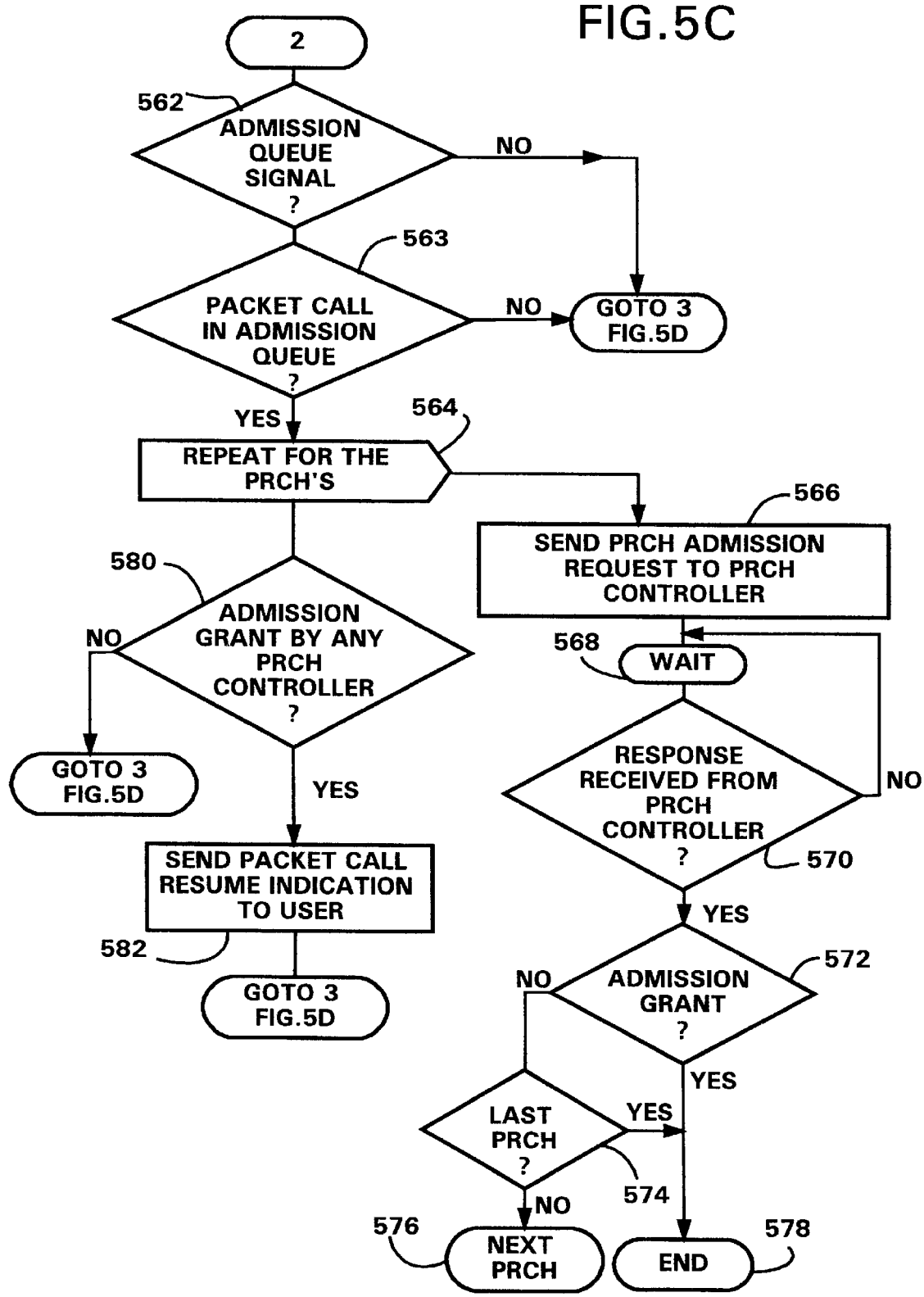

At Step 562 of FIG. 5C it is determined if an admission queue signal was received. If an admission queue signal was not received, the process moves to Step 584 of FIG. 5D. If, however, it is determined that an admission queue signal was received, the process moves to Step 563. At Step 563 it is determined if any packet calls are in the PRCH admission queue. If no packet calls are in the PRCH admission queue 420 of the cell, the process moves to the wait state of Step 502 in FIG. 5A. At Step 502 the process will wait for an input. If, however, it is determined at Step 563 that the PRCH admission queue 420 contains packet calls, the process moves to Step 564. At Step 564 a PRCH admission request for the packet call having a highest priority in the admission queue 420 is sent to PRCH controller 406a, 406b, 406c or 406d, from PRCH manager 402.

The admission request process of Step 564 involves Steps 566, 568, 570, 572, 574, 576 and 578. Step 564 is repeated for each PRCH controller, 406a, 406b, 406c or 406d, until admission to a PRCH is granted or, until admission has been requested to all PRCHs. At Step 566 PRCH manager 402 sends a PRCH admission request to PRCH controller 406a, 406b, 406c or 406d. The process then moves to Step 568 as PRCH manager 402 waits for a response. The PRCH manager 402 periodically checks at Step 570 to determine whether a response has been received from PRCH controller 406. If no response has been received, the process moves back to the wait state of 568. If, however, it is determined at Step 570 that a response has been received from the PRCH controller to which the admission request had been sent the process moves to Step 572, where it is determined if the response is an admission grant. If the response is an admission grant, the admission request process ends at Step 578 and the process moves to Step 586. If, however, at Step 572, it is determined that the response is not an admission grant, it is an admission denied response, and the process moves to Step 574 where it is determined if the admission denied response was sent from the last PRCH controller to which an admission request could be sent.

If it was not the last PRCH controller, the process moves to Step 566 and repeats the admission request process of Step 564 for the next PRCH. The admission request evaluation of Step 564 is repeated until an admission grant response is received from a PRCH controller or, until all PRCH controllers 406a, 406b, 406c and 406d have denied admission. When the admission request process of Step 564 is completed the process moves to Step 580.

At Step 580 it is determined if an admission grant response was received from any PRCH controller in Step 564. If an admission grant response was received from a PRCH controller, the packet call having a highest priority in the admission queue 420 is removed from the queue and the process moves to Step 582 where a packet call resume indication signal is sent to the user via the NW/PS 222. From Step 582 the process moves to Step 584 of FIG. 5D. If, however, at Step 580 it is determined that an admission grant was not received, the process moves directly to Step 584 of FIG. 5D.

At Step 584 of FIG. 5D it is determined if a PRCH setup grant was received from resource manager 402. If a PRCH setup grant was received from resource manager 402, the process moves to Step 586 and the PRCH manager creates a new PRCH controller. Next, the process moves to Step 592. If, however, at Step 584, it is determined that a PRCH release grant was not received, the process moves to Step 588 where it is determined if a PRCH release grant was received from resource manager 402. If a PRCH setup grant was received, the process moves to Step 590 where the PRCH manager deallocates resources from the PRCH controller for which the release request was sent. Next, the process moves to Step 592. If, however, at Step 588, it is determined that a PRCH setup grant was not received, the process moves directly to Step 592.

At Step 592 the requested traffic for all packet calls in the admission queue are evaluated. Next, at Step 594, it is determined if a new PRCH is required. If the total required estimated average data traffic of all packet calls in the admission queue $P_q$ exceeds a limit $P_{new}$ PRCH set for the admission queue, a new PRCH is required and the process moves to Step 596. In alternatives of the embodiment, the comparison of $P_q$ and $P_{new}$ PRCH may be done using a $P_q$ and $P_{new}$ PRCH value for the uplinks and downlinks separately, or, using $P_q$ and $P_n$ PRCH values for the uplinks and downlinks of the cell combined. At Step 596 a PRCH setup request is sent to resource manager 404. From Step 596 the process returns to the wait state of Step 502. If, however, at Step 594 it is determined that a new PRCH is not required, the process moves to Step 597.

At Step 597 the number of packet calls on each PRCH is evaluated. Next, at Step 598, it is determined if any PRCH exists that is not carrying any packet calls. If it is determined that no PRCH not carrying any packet calls exists, the process returns to Step 502 of FIG. 5A. If, however, at Step 598 it is determined that one or more PRCHs exist that are not carrying packet calls, the process moves to Step 599 where a PRCH release request is sent to resource manager 404 for each PRCH not carrying any packet call. From Step 599 the process returns to the wait state of Step 502 of FIG. 5A.

Referring now to FIGS. 6, 7 and 8A–8C, therein are illustrated flow diagrams showing Steps followed by each PRCH controller, 406a, 406b, 406c or 406d, for the PRCH traffic supervision, PRCH admission control and PRCH congestion control processes, respectively, according to an embodiment of the present invention. PRCH controllers 406a, 406b, 406c and 406d each continuously supervise data traffic, the average packet delay and, also receive admission requests for a PRCH.

Figure 6:
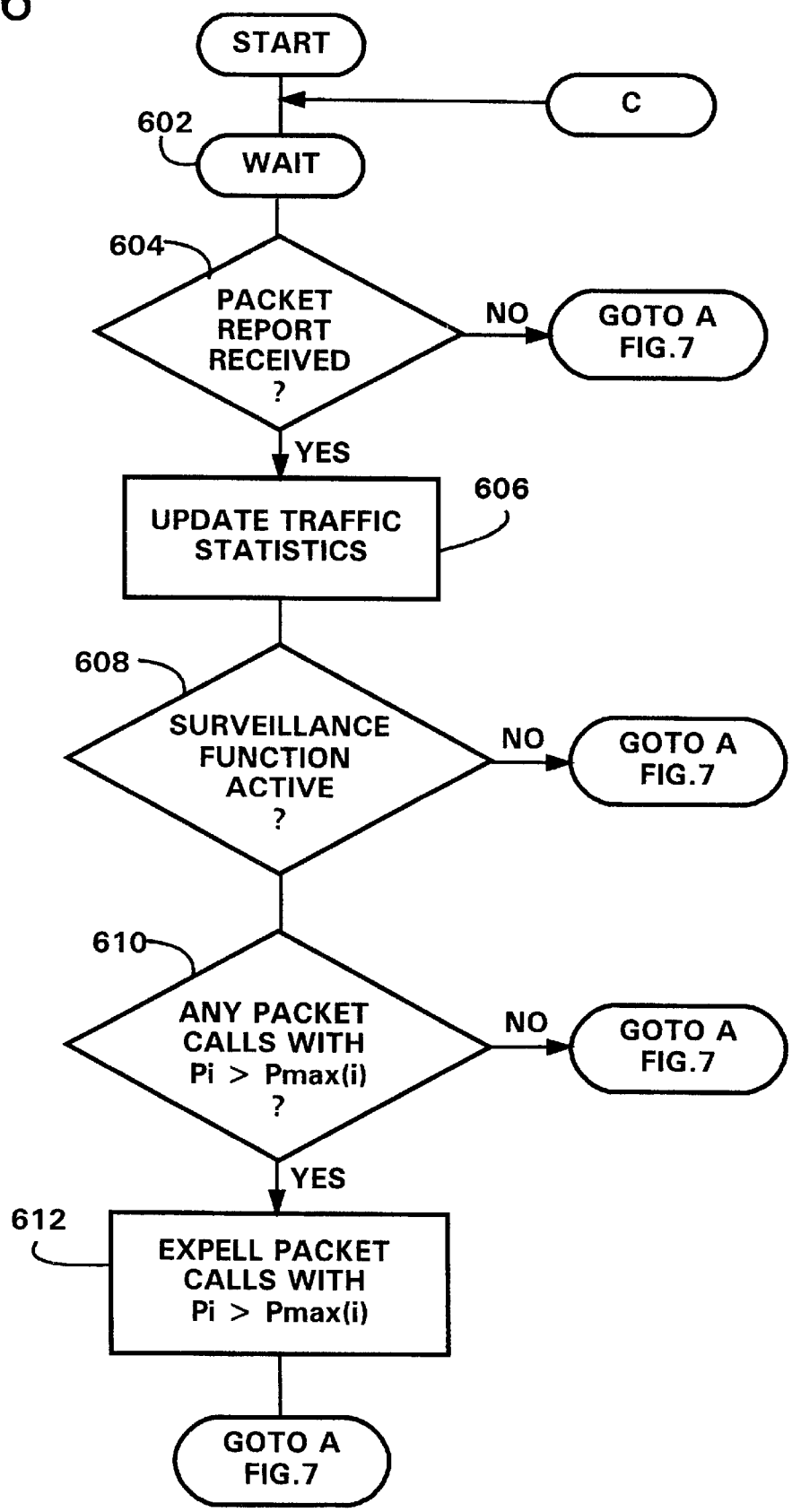
FIG. 6 is a flow diagram illustrating process steps followed by the packet radio channel controller traffic supervision function according to an embodiment of the present invention.

When initially activated upon receiving an input from PRCH manager 402, the process is in the wait state of Step 602 of FIG. 6. While in the wait state of Step 602, each PRCH controller 406a, 406b, 406c and 406d may receive an input in the form of a packet report from the NW/PS 222, an admission request from PRCH manager 402 or an internally generated activation signal indicating a PRCH congestion check should be done. Upon receiving an input the process moves to Step 604 where it is determined if a packet report was received. If it is determined that a packet report was not received, the process moves directly to Step 708 of FIG. 7. If, however, at Step 604, it is determined that a packet report was received, the process will move to Step 606 where the PRCH traffic supervisor function 414 updates traffic statistics for the relevant PRCH. The traffic statistics are updated using information contained in the packet report. Each packet report contains the following information:

1) Transmitting mobile user identity for UL or transmitting network user identity for DL.
2) Packet size (number of frames)
3) Time stamp (indicating when the packet was placed in the transmission buffer).
4) Packet type (UL or DL).

Using the information contained in the packet report the PRCH controller calculates the following:

1) The packet size (in time), X, is calculated using knowledge about the frame size.
2) The packet delay, D, is calculated as the difference between the time the packet report was received and the time the packet was placed in the transmission buffer (as indicated by the time stamp). Depending on when the packet report is sent from the protocol stack (at the beginning of the transmission or after transmission completion), the calculated delay is adjusted so that it corresponds to the time elapsed at transmission completion.
3) The time elapsed, Δt, since the previous packet report with the same packet identifier is received. The time of receival for the last packet report for each packet call is stored for this purpose.

X, D and Δt are then used to calculate an estimate of average data traffic (Pi) for each individual packet call an estimate of average data traffic (Pchan) for all packets calls on the PRCH, and an estimate of the average packet delay (T) for all packet calls on the PRCH. In alternatives of the embodiment, values of the Pi, Pchan and T may be calculated for the uplink and downlink of a PRCH separately, or as values for the combined uplink and downlink of the PRCH. The alternative used depends on which type of value the system operator needs for other functions, i.e., whether other functions in the system are using values for the uplink and downlink separately or, uplink and downlink combined.

The estimate of average data traffic $Pi_N$ may be updated by calculating Pi for each new packet report (number N) of the packet call i as follows:

$$Pi_N = a_N Pi_{N-1} + (1 - a_N)\frac{X_N}{\Delta t_N}$$

where, $$a_N = \frac{1}{1 + e^{-\frac{\Delta t_N}{\tau}}\left(\frac{\Delta t_N}{\Delta t_{N-1}}\right)(1 - a_{N-1})}; a_1 = 0$$

The time constant τ corresponds to the filter memory (correlation time).

In the calculation of Pi, the contribution from a single packet $$\left(\frac{X_j}{\Delta t_j}\right)$$

is weighted by the factor.

$$\Delta t_j e^{-\frac{t_j}{\tau}}$$

where $t_j$ denotes the time elapsed since the last packet report for packet call j and $\Delta t_j$ denotes the time elapsed between packet report j−1 and j. This particular weighting factor gives older samples less weight than newer samples and proportions the weight to the time period $\Delta t_j$ associated with the sample.

The equations shown above for Pi calculation may also be used to calculate Pchan. In this case, the variable $Pi_N$ and $Pi_{N-1}$ would be replaced by $Pchan_N$ and $Pchan_{N-1}$, respectively, and packet reports from all packet calls on the PRCH would be used in the calculations.

The estimate of the average packet delay $(T_N)$ for the PRCH may be updated by calculating T for each new packet report (number N) of the PRCH as follows:

$$T_N = a_N T_{N-1} + (1-a_N)D$$

where, $$a_N = \frac{1}{1 + e^{-\frac{\Delta tN}{\tau}}(1 - a_{N-1})}; a_1 = 0$$

The time constant τ corresponds to the filter memory (correlation time).

In the calculation of T the contribution from a single packet (T) is weighted by the factor:

$$e^{\frac{t_j}{\tau}}$$

where $t_j$ denotes the time elapsed since the last packet report received on the PRCH. This particular weighting factor gives older samples less weight than newer samples.

The values Pi, Pchan and T may be used at Step 608 and for the admission control process (FIG. 7), and the congestion control process (FIG. 8).

After updating the traffic statistics at Step 606, the process moves to Step 608.

At Step 608 it is determined if the excess traffic monitor function is active. If a determination is made that the excess traffic monitor function is not active, the process moves to Step 708 of FIG. 7. If, however, it is determined that the excess traffic monitor function is active, the process moves to Step 610 where it is determined if any packet call i exists on the PRCH meeting the condition, $P_i > P_{max(i)}$. If no packet calls exist on the PRCH with $P_i > P_{max(i)}$, the process moves to Step 708 of FIG. 7. If, however, at Step 610, it is determined that packet call(s) exist meeting the condition, $P_i > P_{max(i)}$, the process moves to Step 612. At Step 612 the packet call or packet calls with $P_i > P_{max(i)}$ are expelled from the PRCH and a packet call expelled indication is sent to the PRCH manager 402 indicating which packet call or packet calls were expelled. The process then moves to Step 708 of FIG. 7. As an alternative to expelling the packet on the PRCH with $P_i > P_{max(i)}$, the system could send a request to the user to change priority or increase its traffic requirements. A change in traffic requirements would result in a higher $P_{max(i)}$ for the packet call.

Figure 10:
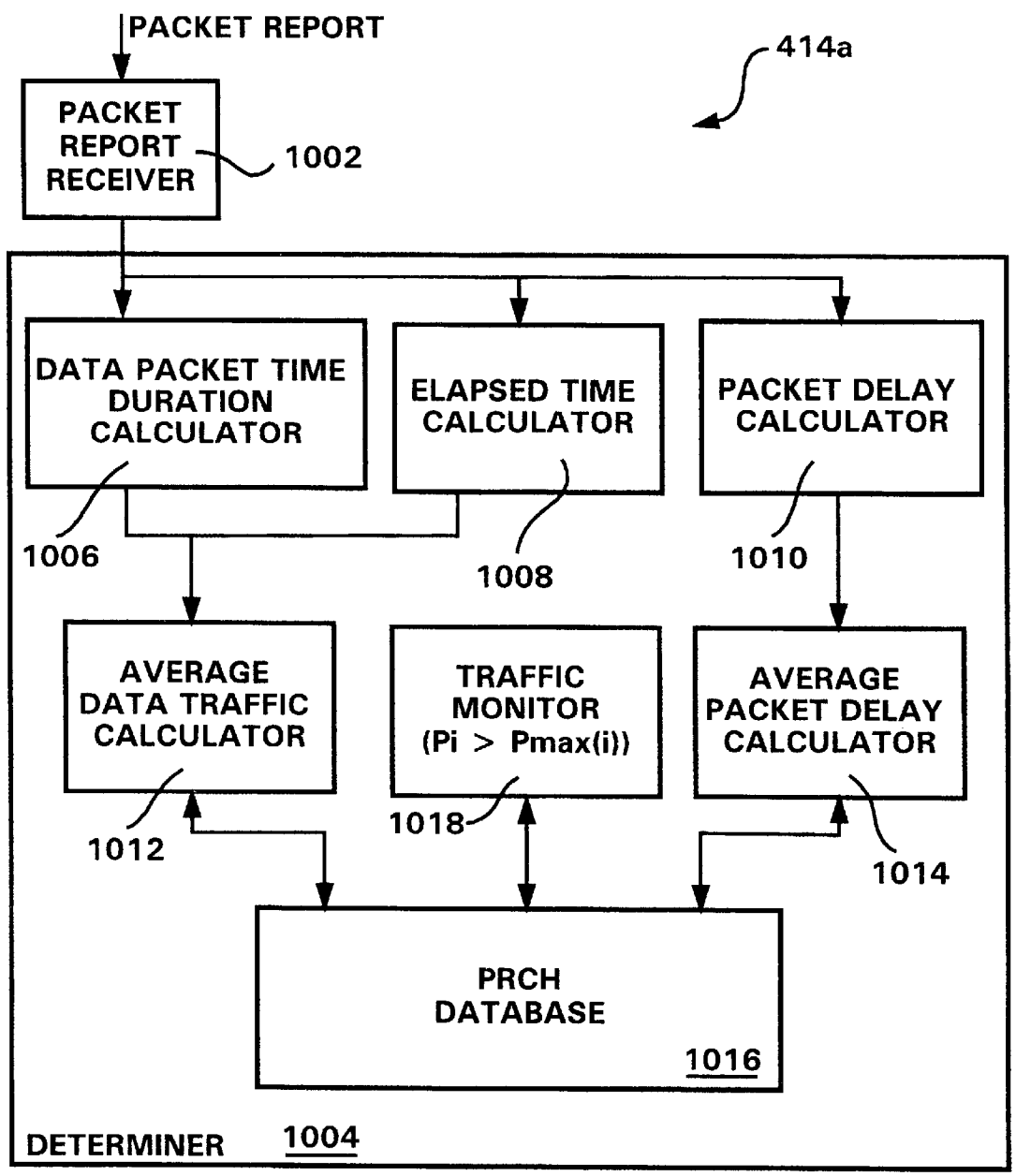
FIG. 10 is a schematic block diagram illustrating a packet traffic supervisor according to an embodiment of the present invention.

Referring now to FIG. 10, therein is a schematic block diagram illustrating one hardware embodiment of the packet traffic supervision function 414a of FIG. 4. In the embodiment shown in FIG. 10, the traffic supervision function comprises a packet report receiver 1002 and determiner 1004 for determining the traffic statistics. Determiner 1004 comprises a data packet time duration calculator 1006, elapsed time calculator 1008, packet delay calculator 1010, average data traffic calculator 1012, average packet delay calculator 1014, database 1016, and excess traffic monitor 1018.

FIG. 7 illustrates the steps performed by packet radio channel admission control function of the invention. The flow diagram of FIG. 7 will be entered at Step 708 from Steps 604, 608, 610 or 612 of FIG. 6. At Step 708 it is determined if the input was an admission request. If an admissions request was not received, the traffic statistics have been updated or an internally generated activation signal indicating that PRCH congestion check should be done has been received, and the process will move directly to Step 818 of FIG. 8. If however, at Step 708, it is determined that an admission request was received, the process will move to Step 710 where the admission request is evaluated.

The PRCH admission control function 416 evaluates the PRCH admission request by determining if the following is true:

$$p_{ave_N} + \Sigma p_i \leq p_{tol}, \ i \in U(Pri)$$

where, $p_{ave_N}$ is the required estimated average data traffic for the new packet call N.

$p_i$ is the estimated average data traffic on the PRCH from packet call i.

U (pri) are the packet calls with priorities higher than or equal to Pri, where $Pri_N$ is the priority for the requested packet call N.

$P_{tol}$ is the maximum tolerable data traffic on the PRCH.

The above equation is satisfied if average data traffic from packet calls with priority higher than or equal to the priority of the new packet call plus the estimated average data traffic required for the new packet call is less than the maximum tolerable traffic $p_{tol}$. Thus, a high priority packet call may be allowed to use the PRCH although the total traffic (including all packet calls regardless of priority) exceeds the maximum tolerable traffic $p_{tol}$. In that case the congestion control function (FIG. 8) will expel lower priority packet calls so that the total traffic will fall below the maximum tolerable traffic $P_{tol}$.

The maximum tolerable traffic $p_{tol}$ is associated with a maximum tolerable delay on the PRCH, $T_{tol}$, according to the relation:

$$P_{tol} = \sum_i P_i + \Delta P$$

$$\Delta P = f(T_{tol} - T)$$

where $f$ is a function having the same sign as its argument and T is the estimate of the average packet delay that is calculated by PRCH traffic supervision function and $\sum_i P_i$ is the sum of the estimated average data traffic for all packet calls on the PRCH.

Because the PRCH controller traffic supervision function continuously monitors T, $P_{tol}$ is continuously updated according to the above equations. $P_{tol}$ will correspond to the traffic level that results in the maximum tolerable delay $T_{tol}$. In alternatives of the embodiment, the admission control evaluation can be performed using $P_{ave_N}$, $P_i$, $P_{tol}$ and $\Delta P$ values for the uplink and downlink of the PRCH separately, or, using values for the combined uplink and downlink of the PRCH.

After evaluating the PRCH admission request at Step 710, the process then moves to Step 712. At Step 712 the results of Step 710 are checked. If a positive determination in the evaluation was made, the process moves to Step 714 where an admission grant is sent to PRCH manager 402. If a negative determination was made in the evaluation, the process moves to Step 716 where an admission denied is sent to the PRCH manager 402. After the PRCH admission control function 416 sends an admission grant or denial at Step 714 or 716, respectively, the process then moves to Step 818 of FIG. 8A.

At Step 818 the PRCH congestion control function 418 evaluates congestion on the PRCH. A delay alarm level set by the system operator, $T_{con}$, and the estimated average packet delay, T, on the PRCH are used to detect a congestion situation, i.e. when it is necessary to expel one or more packet calls from the PRCH in order to regain an acceptable average packet delay on the PRCH.

To evaluate congestion at Step 818 it is determined if $T < T_{con}$. The congestion determination may be made considering uplink and downlink T and $T_{con}$ values in separate determinations, or, using T and $T_{con}$ values for the uplink and downlink combined. Next, at Step 820, the results of Step 818 are checked. If a positive determination was made at Step 818, the process returns to the wait state of Step 602 in FIG. 6. If, however, a negative determination was made at Step 818, the process moves to Step 822, where a packet call or, packet calls are selectively chosen for expulsion from the PRCH.

At Step 822 packet calls may be chosen for expulsion by alternative methods. A single packet call may be expelled or, more than one packet call may be expelled from the PRCH at a time.

Figure 8A:
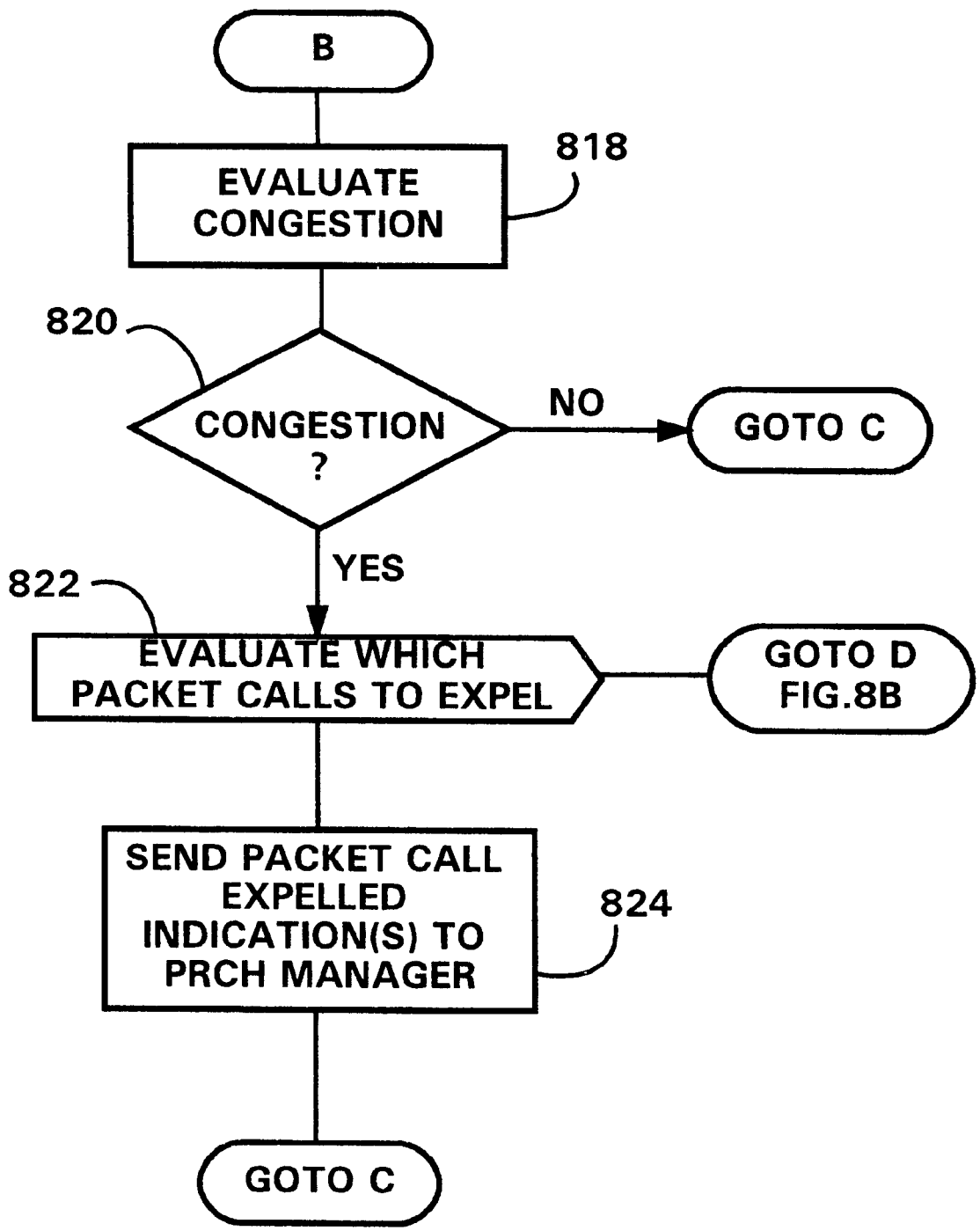
FIGS. 8A–8C are flow diagrams illustrating process steps followed by the packet radio channel controller congestion control function according to an embodiment of the present invention.
Figure 8C:
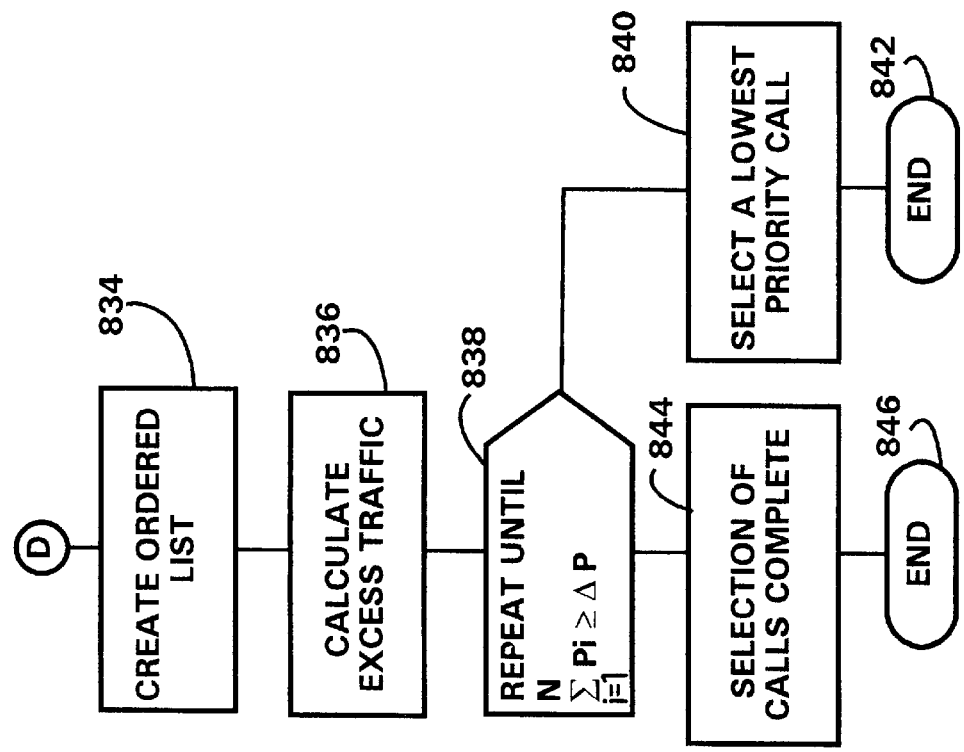
Figure 8B:
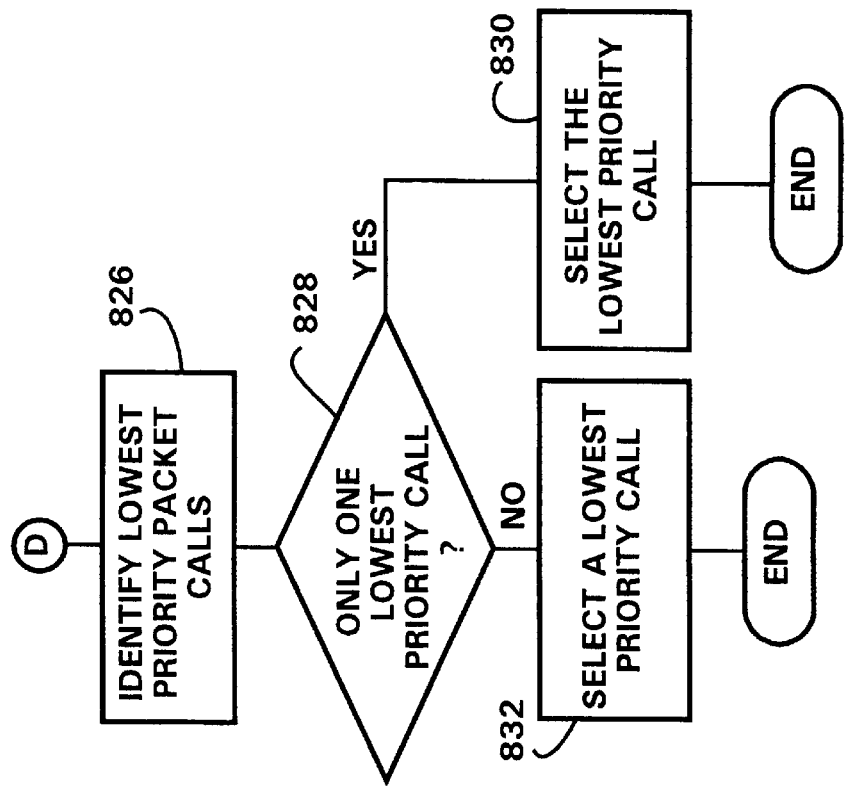

Referring now to FIG. 8B, therein are illustrated process steps followed according to an embodiment of the invention when a single packet call is to be expelled at a time by the congestion control function. At Step 826 the lowest priority packet call or packet calls, if more than one exists with the lowest priority, are identified. Next, at Step 828 it is determined if only one or, if more than one packet call was identified in Step 826. If a determination is made that only one packet call was identified, the process moves to Step 830 and the single identified packet call is selected for expulsion. If, however, a determination is made that more than one packet call having the lowest priority was identified, the process moves to Step 832. At Step 832 one of the identified packet calls is selected for expulsion from the PRCH. The selection of packet call in Step 832 may be done by alternative methods. A packet call may be randomly chosen from the identified packet calls or, one may be chosen based on a comparison using a select parameter associated with each of the packet calls. Depending on the alternative used at Step 818, the selected parameter may be a parameter value for the uplink and downlink separately or, for the combined uplink and downlink.

As an example, one of the following parameters of the lowest priority packet calls, could be selected for comparison:

$P_{ave}$ $P_i$ $P_{max(i)}$ $\Delta P_{max} = P_i - P_{max(i)}$.

A packet call could then be selected by choosing the packet call having the largest value of the compared parameter or, the smallest value of thus compared parameter, depending on the system operator's desires.

As an alternative method of performing Step 822, more than one packet call may be expelled at a time. Referring now to FIG. 8C, therein are illustrated process steps followed according to an embodiment of the invention when more than one packet call is to be expelled at one time by the congestion control function. At Step 834 a list of packet calls ordered from lowest priority to highest priority is created. Next, at Step 836, an excess traffic value is calculated for the PRCH. The excess traffic value may be calculated as follows:

$$\Delta P = f(T_{tol} - T_{con})$$

where $f$ is a function having the same sign as its argument, $T_{tol}$ equals the maximum tolerable delay of the PRCH and $T_{con}$ equals the threshold as defined above. Depending on the alternative used at Step 818, $\Delta P$ may be calculated and checked for the uplink and downlink separately, considering uplink and downlink values of $T_{tol}$ and $T_{con}$, or, calculated and checked for the uplink and downlink combined using $T_{tol}$ and $T_{con}$ values for the uplink and downlink combined. From Step 836 the process moves to Step 838. At Step 838 packet calls are selected from the list created in Step 834, in order of ascending priority by repeating Steps 840 to 846, until the following equation is satisfied:

$$\sum_{i=1}^{N} P_i \geq \Delta P$$

where $$\sum_{i=1}^{N} P_i$$

is the sum of average data traffic of the selected packet calls and $\Delta P$ is the excess data traffic as calculated in Step 836. If more than one packet call exists having the lowest priority, the lowest priority packet calls may be selected for expulsion in random order or, as an alternative, in an order based on a comparison using a select parameter associated with each of the packet calls as was described for Step 832 in FIG. 8B.

After choosing packet calls for expulsion from the PRCH at Step 822, the process then moves to Step 824 and sends a packet call expelled indication for each of the chosen packet calls to the PRCH manager. The process then returns to the wait state of Step 602 in FIG. 6. Upon the next internally generated activation signal indicating a PRCH congestion check should be done or, receiving a packet report, the process will again evaluate congestion on the PRCH and expel additional packet calls, if necessary.

Figure 11:
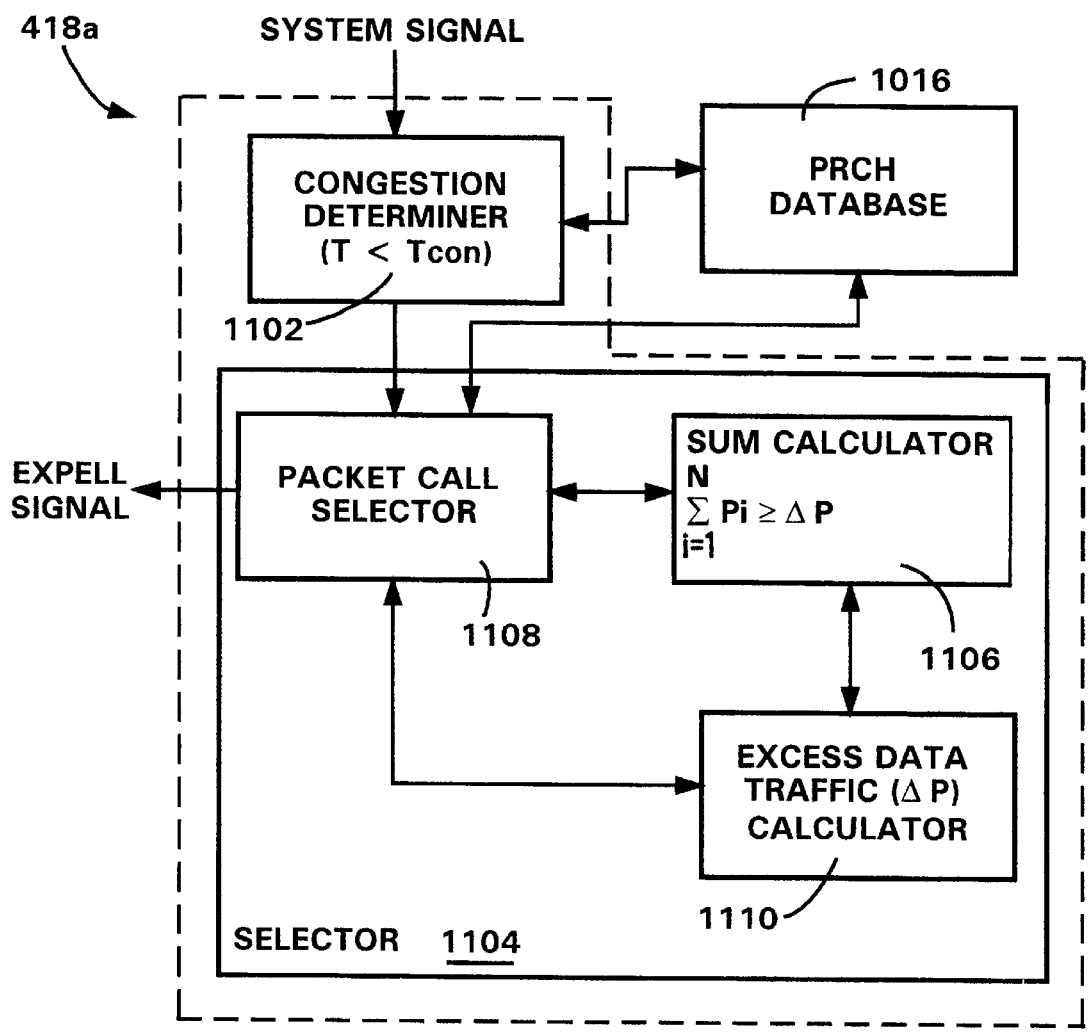
FIG. 11 is a schematic block diagram illustrating a packet traffic congestion control function according to an embodiment of the present invention.

Referring now to FIG. 11, therein is a schematic block diagram illustrating one hardware embodiment of the packet congestion control function 418a of FIG. 4. In the embodiment shown in FIG. 11, the congestion control function comprises a congestion determiner 1102 and a selector 1104. Selector 1004 comprises a packet call selector 1108, sum calculator 1106 for determining if $$\sum_{i=1}^{N} P_i \geq \Delta P,$$

and an excess data traffic calculator 1110 for determining $\Delta P$. The congestion control function 418a interfaces with PRCH database 1016. The embodiment shown in FIG. 10 is a representative embodiment. It is well known in the art that functions of this type may be implemented in either hardware or software, or in a combination of hardware or software, operating in conjunction with one or more processors.

Figure 9:
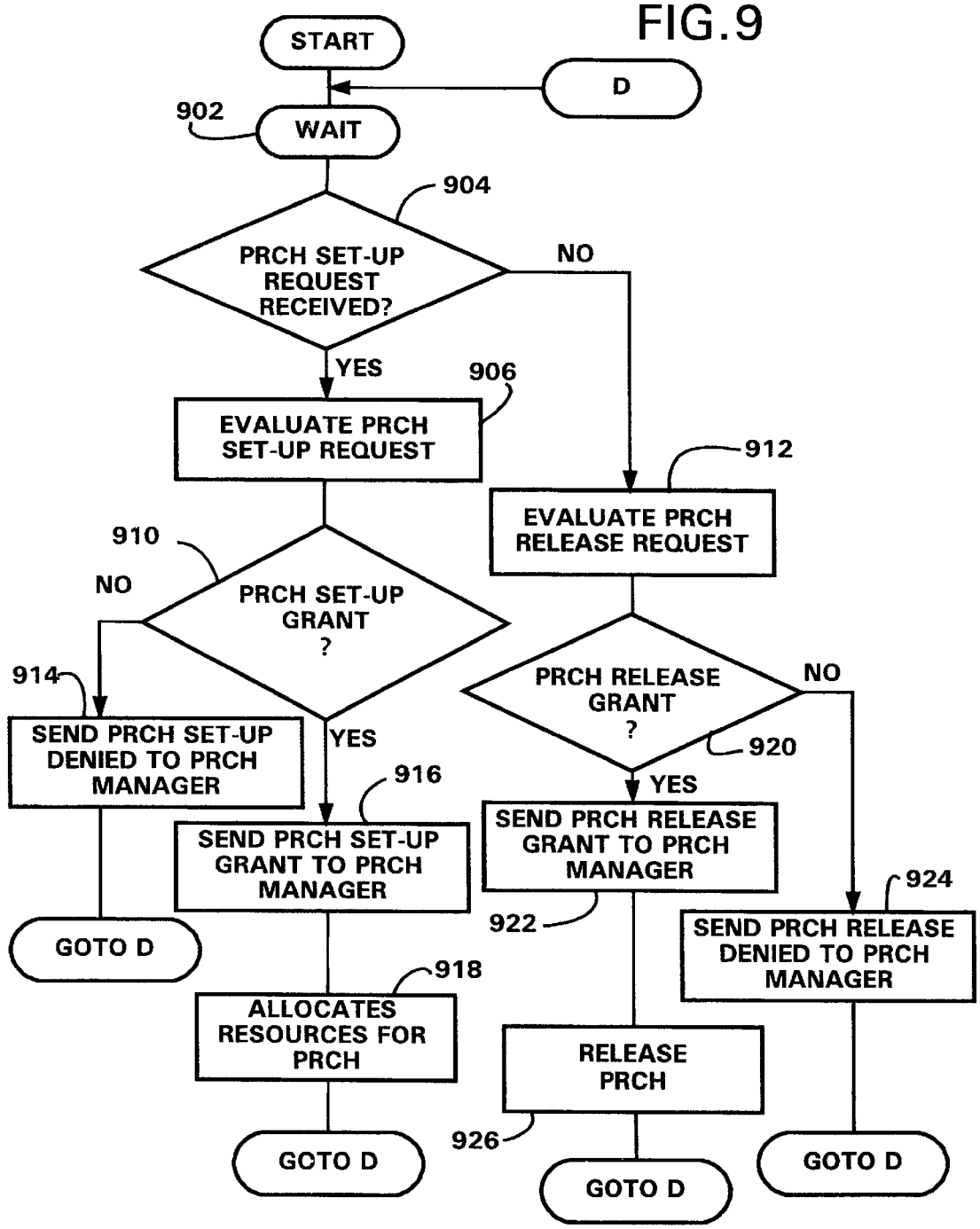
FIG. 9 is a flow diagram illustrating process steps followed by the packet radio channel resource manager according to an embodiment of the present invention.

Referring now to FIG. 9, therein is a flow diagram illustrating process steps followed by the resource manager function according to an embodiment of the invention. The resource manager process is in the wait state of Step 902 when an input is received from the PRCH manager 402. The input may be a PRCH setup request or a PRCH release request. Upon receiving an input, the process moves to Step 904. At Step 904 it is determined if the input is a PRCH setup request. If the input is a PRCH setup request, the process moves to Step 906.

At Step 906 the PRCH setup request is evaluated. The resource manager evaluates the setup request by determining if adequate resources exist within the cell to allow a new PRCH to be set up. From Step 906 the process moves to Step 910. At Step 910 it is determined if the setup request evaluation indicates a new PRCH may be set up. If it is determined that a new PRCH may be set up, the process moves to Step 916 where a PRCH setup grant is sent to PRCH manager 402. Next, at Step 918, the resource manager allocates resources for a new PRCH. From Step 918 the process returns to the wait state of Step 902. If, however, at Step 910 it is determined that the setup request evaluation indicates that a new PRCH may not be set up, the process moves to Step 914 where a PRCH setup denied is sent to PRCH manager 402. From Step 914 the process returns to the wait state of Step 902.

If the input is determined not to be a PRCH setup request at Step 904, it is a PRCH release request. In this case the process moves from Step 904 to Step 912. At Step 912 the PRCH release request is evaluated. The resource manager evaluates the PRCH release request by determining whether it is acceptable to release the PRCH from an overall system point of view. For example, the traffic load on PRCHs of surrounding cells could be taken into account. From Step 912 the process moves to Step 920. At Step 920 it is determined if the PRCH release request evaluation indicates a PRCH may be released. If it is determined that the PRCH may be released, the process moves to Step 922 where a PRCH release grant is sent to PRCH manager 402. Next, at Step 926, the resource manager releases the PRCH. From Step 926 the process returns to the wait state of Step 902. If, however, at Step 920, it is determined the PRCH release request evaluation indicates that the PRCH may not be released, the process moves to Step 924 where a PRCH release denied is sent to PRCH manager 402. From Step 924 the process returns to the wait state at Step 902.

As can be seen from the above description, the method and system of the invention can be used by a system operator to manage packet traffic for prioritized users on one or more PRCHs of a cellular telecommunications system. The system operator can set a maximum average time delay for the PRCH. The users can be prioritized according to a level of service subscribed to or a priority could be assigned automatically or chosen by the user depending on the type of call being made. A higher priority level may incur a higher charge rate for using the system.

What is claimed is:

1. In a telecommunications system comprising at least one packet radio channel and a plurality of transceiving stations, each of said transceiving stations capable of transmitting or receiving at least one packet call comprising a plurality of data packets on the at least one packet radio channel, a method of controlling congestion on the at least one packet radio channel, said method comprising the steps of:

determining whether congestion exists on the at least one packet radio channel;

and, in response to an affirmative determination;

calculating excess data traffic within the at least one packet radio channel;

selecting at least one packet calls on the at least one packet radio channel having a lowest assigned priority until a sum of average data traffic associated with said selected packet calls is greater than or equal to said excess data traffic; and expelling said selected packet calls from the at least one packet radio channel once the sum of average data traffic associated with said selected packet calls is greater than or equal to said excess data traffic.

2. The method of claim 1 in which said step of determining comprises the step of determining whether an average packet delay on an uplink of the at least one packet radio channel is greater than a predetermined delay level.

3. The method of claim 1 in which said step of determining comprises the step of determining whether an average packet delay on a downlink of the at least one packet radio channel is greater than a predetermined delay level.

4. The method of claim 1 in which said step of determining comprises the step of determining whether an average packet delay for the combined downlink and uplink of the at last one packet radio channel is greater than a predetermined delay level.

5. The method of claim 1 in which said excess data traffic and the sum of the average data traffic are associated with an uplink of the at least one packet radio channel.

6. The method of claim 1 in which said excess data traffic and the sum of the average data traffic are associated with a downlink of the at least one packet radio channel.

7. The method of claim 1 in which said excess data traffic and the sum of the average data traffic are associated with a combined downlink and uplink of the at least one packet radio channel.

8. The method of claim 1 in which said step of selecting comprises selecting at least one packet call having a lowest assigned priority is based upon a data traffic parameter value assigned to each of said packet calls on the at least one packet radio channel.

9. In a telecommunications system comprising at least one packet radio channel and a plurality of transceiving stations, each of said transceiving stations capable of transmitting or receiving at least one packet call comprising a plurality of data packets on the at least one packet radio channel, a method of controlling congestion on the at least one packet radio channel, said method comprising the steps of:

determining whether congestion exists on the at least one packet radio channel; and, in response to an affirmative determination;

identifying a number of packet calls having a lowest assigned priority from said plurality of packet calls on the at least one packet radio channel; and if only one packet call exists having a lowest priority, selecting the one packet call;

if a plurality of packet calls exist having a lowest priority, selecting a single packet call from the plurality of packet calls having a lowest priority based upon at least one of the following traffic values parameters assigned to said plurality of packet calls on the packet radio channel: estimated average data traffic for the packet call, estimated average data traffic for the at least one packet radio channel, estimated maximum data traffic for the at least one packet radio channel, and estimated maximum data traffic for the packet call; and expelling said selected packet call from the at least one packet radio channel.

10. In a telecommunications system comprising at least one packet radio channel and a plurality of transceiving stations, each of said transceiving stations capable of transmitting or receiving at least one packet call comprising a plurality of data packets on the at least one packet radio channel, an apparatus for controlling congestion on the at least one packet radio channel, said apparatus comprising:

a congestion determiner for comparing the average packet delay on the at least one packet radio channel to a predetermined delay level to determine whether congestion exists on the at least one packet radio channel;

first means for calculating an amount excess data traffic on the at least one packet radio channel if congestion exists;

second means for calculating a sum of an amount of average data traffic represented by selected packet calls and determining if the sum of the amount of average traffic data equals or exceeds the amount of excess data traffic; and a packet call selector for selecting the selected packet calls for the second means for calculating until the sum of the amount of average data traffic equals or exceeds said excess data traffic value, and generating a signal indicating that said selected packet calls are selected for expulsion.

11. The apparatus of claim 10 in which said congestion determiner comprises means for determining whether a calculated average packet delay on an uplink of the at least one packet radio channel is greater than a predetermined delay level.

12. The apparatus of claim 10 in which said congestion determiner comprises means for determining whether a calculated average packet delay on a downlink of the at least one packet radio channel is greater than a predetermined delay level.

13. The apparatus of claim 10 in which said congestion determiner comprises means for determining whether a calculated average packet delay for the combined downlink and uplink of the at least one packet radio channel is greater than a predetermined delay level.

14. The apparatus of claim 10 in which each of said plurality of packet calls is further assigned a priority, and in which said packet call selector selects said packet call from packet calls having a lowest assigned priority of packet calls on said packet radio channel.

* * * * *

UNITED STATES PATENT AND TRADEMARK OFFICE
CERTIFICATE OF CORRECTION

PATENT NO. : 6,097,700

DATED : August 1, 2000

INVENTOR(S) : Thornberg et al.

It is certified that error appears in the above-indentified patent and that said Letters Patent is hereby corrected as shown below:

Column 4 line 40      Replace "PRCHS"
With --PRCHs--

Column 17, line 26      Replace "thus"
With --the--

Signed and Sealed this

Twenty-fourth Day of April, 2001

Attest:

NICHOLAS P. GODICI

Attesting Officer      Acting Director of the United States Patent and Trademark Office